United States Patent
Zoller et al.

(10) Patent No.: US 11,383,333 B2
(45) Date of Patent: Jul. 12, 2022

(54) MULTI-CLAMPING AND MEASURING AND/OR PRESETTING STATION FOR TOOLS, AND METHOD FOR MOUNTING/DEMOUNTING A TOOL INTO/FROM A TOOL HOLDER

(71) Applicant: E. Zoller GmbH & Co. KG, Pleidelsheim (DE)

(72) Inventors: Alexander Zoller, Pleidelsheim (DE); Christoph Zoller, Pleidelsheim (DE)

(73) Assignee: E. ZOLLER GMBH & CO. KG EINSTELL-UND MESSGERÄTE, Pleidelsheim (DE)

( * ) Notice: Subject to any disclaimer, the term of this patent is extended or adjusted under 35 U.S.C. 154(b) by 126 days.

(21) Appl. No.: 16/887,296

(22) Filed: May 29, 2020

(65) Prior Publication Data
US 2020/0391335 A1    Dec. 17, 2020

(30) Foreign Application Priority Data
Jun. 7, 2019 (DE) ................... 10 2019 115 607.6

(51) Int. Cl.
*B23P 19/06* (2006.01)
*B23P 19/02* (2006.01)
(Continued)

(52) U.S. Cl.
CPC ............. *B23P 19/06* (2013.01); *B23P 11/027* (2013.01); *B23P 19/02* (2013.01)

(58) Field of Classification Search
CPC ......... B23P 19/02; B23P 19/06; B23P 11/027; B23Q 17/2457; B23Q 17/0919
See application file for complete search history.

(56) References Cited

U.S. PATENT DOCUMENTS 7,144,355 B2 * 12/2006 Momochi .......... B23Q 3/15553
                                                             483/31
10,507,989 B2 * 12/2019 Zollitsch ................ B25J 19/023
(Continued)

FOREIGN PATENT DOCUMENTS

DE    103 30 098 A1    1/2004
DE    103 05 691 A1    8/2004
(Continued)

OTHER PUBLICATIONS

Pfau et al.; Automated Tool Adjustment and/or Tool Measurement; Feb. 28, 2019; English Machine Translation; pp. 1-34 (Year: 2021).*
(Continued)

*Primary Examiner* — Bayan Salone
(74) *Attorney, Agent, or Firm* — Posz Law Group, PLC

(57) ABSTRACT

A multi-clamping and measuring and/or presetting station for tools is configured for an automated, preferably fully automated, mounting of tools into tool holders and/or demounting of tools from tool holders and for an adjustment, in particular at least a length adjustment, and/or measuring of the tools in the tool holders with at least two, in particular fully automated, tool clamping-in units, with at least one, in particular optical, measuring and/or presetting apparatus for tools and with at least one handling robot, which is at least configured to move tools and tool holders between the tool clamping-in units and the measuring and/or presetting apparatus.

24 Claims, 13 Drawing Sheets

Figure 1:
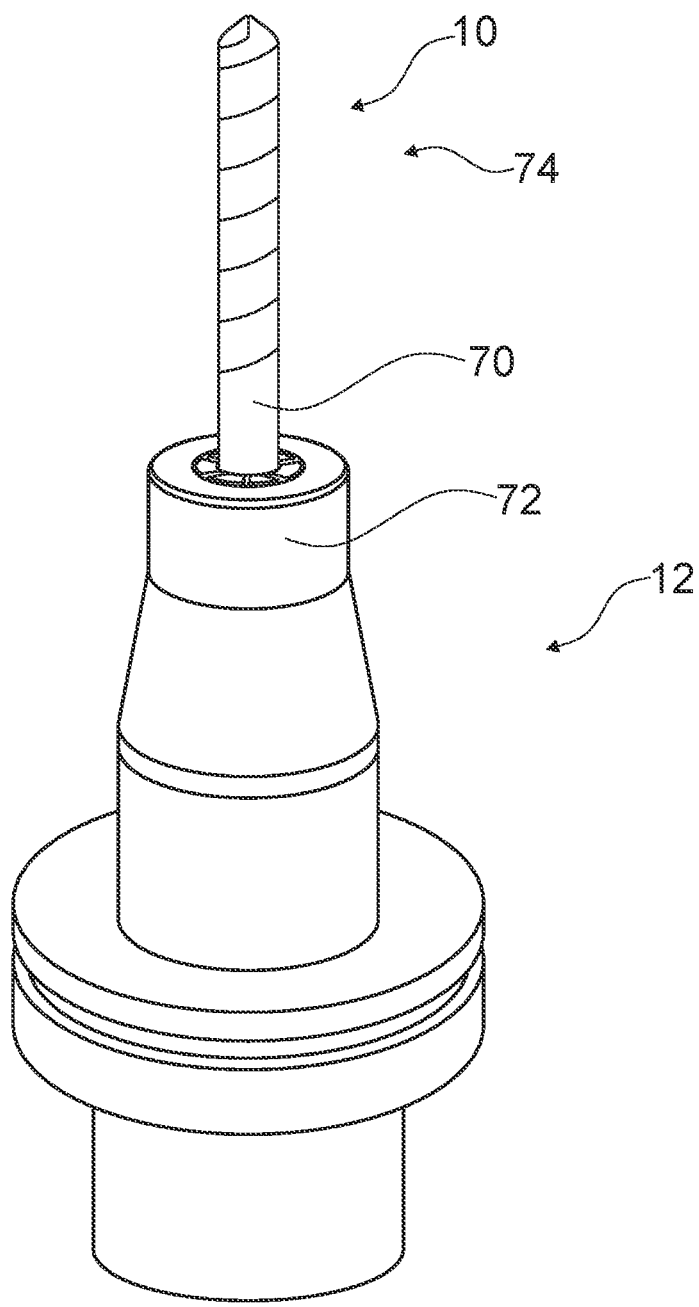

(51) Int. Cl.
B23P 11/02 (2006.01)
B23Q 17/24 (2006.01)
B23Q 17/09 (2006.01)

(56) References Cited

U.S. PATENT DOCUMENTS

| | | | |
|---|---|---|---|
| 2004/0005973 A1* | 1/2004 | Momochi | B23Q 3/15553 |
| | | | 483/1 |
| 2018/0208409 A1* | 7/2018 | Zollitsch | B65G 47/905 |
| 2020/0030929 A1 | 1/2020 | Zoller et al. | |

FOREIGN PATENT DOCUMENTS

| | | | | |
|---|---|---|---|---|
| DE | 10305691 A1 * | 8/2004 | | B23P 11/027 |
| DE | 10 2008 043 195 A1 | 5/2010 | | |
| DE | 102008043195 B4 * | 4/2013 | | B65H 29/241 |
| DE | 20 2013 105 390 U1 | 4/2015 | | |
| DE | 202015006540 U1 * | 12/2015 | | B23P 11/027 |
| DE | 20 2015 006 540 U1 | 1/2016 | | |
| DE | 10 2018 113 704 A1 | 12/2019 | | |
| DE | 102018113704 A1 * | 12/2019 | | B23Q 11/02 |
| DE | 10 2018 116 263 A1 | 1/2020 | | |
| DE | 102018116263 A1 * | 1/2020 | | B23Q 17/24 |
| DE | 10 2019 108 605 A1 | 10/2020 | | |
| EP | 3 351 350 A2 | 7/2018 | | |
| EP | 3351350 A2 * | 7/2018 | | B65G 47/1478 |
| JP | 2000-77288 A | 3/2000 | | |
| WO | 2012/107038 A1 | 8/2012 | | |
| WO | 2019/038190 A1 | 2/2019 | | |
| WO | WO-2019038190 A1 * | 2/2019 | | B23Q 17/0923 |

OTHER PUBLICATIONS

Partial European Search Report dated Oct. 27, 2020 issued in corresponding to EP patent application No. 20178454.3.(and English version enclosed).

Extended European Search Report dated Jan. 22, 2021 issued in corresponding to EP patent application No. 20178454.3 (and English version enclosed).

Search Report dated Feb. 5, 2020 issued in corresponding DE patent application No. 10 2019 115 607.6 (English translation only).

* cited by examiner

MULTI-CLAMPING AND MEASURING AND/OR PRESETTING STATION FOR TOOLS, AND METHOD FOR MOUNTING/DEMOUNTING A TOOL INTO/FROM A TOOL HOLDER

CROSS REFERENCE TO RELATED APPLICATION

This application is based on and incorporates herein by reference German Patent Application No. 10 2019 115 607.6 filed on Jun. 7, 2019.

STATE OF THE ART

The invention concerns a multi-clamping and measuring and/or presetting station.

Manually loadable tool clamping stations having no presetting and/or no measuring facilities are known from the state of the art.

The objective of the invention is in particular to provide a generic device with advantageous characteristics regarding flexibility.

Advantages of the Invention

A multi-clamping and measuring and/or presetting station for tools is proposed, which is configured for an automated, preferably fully automated, mounting of tools into tool holders and/or demounting of tools from tool holders and for an adjustment, in particular at least a length adjustment, and/or measuring of the tools in the tool holders, with at least two, preferably at least a plurality of, in particular fully automated, identical and/or different tool clamping-in units, in particular for a clamping-in and/or clamping-out of the tools into and/or from the tool holders, with at least one, in particular optical, measuring and/or presetting apparatus for tools and with at least one handling robot, which is at least configured to move tools and tool holders between the tool clamping-in units and the measuring and/or presetting apparatus. This advantageously allows achieving a high degree of flexibility. It is in particular advantageously possible to achieve a time-saving and/or personnel-saving clamping-in and/or clamping-out of tools into and/or from tool holders. Advantageously costs can be kept low. Advantageously it is possible for several work steps, for which in particular different work stations were necessary before, to be comprised in one single work station, as a result of which in particular an advantageously high effectivity is achievable.

By a "multi-clamping and measuring and/or presetting station" is in particular a device to be understood which is at least configured to load, in particular at least partly simultaneously, a plurality of identical and/or preferentially different tool holders with tools, and/or to remove tools, in particular at least partly simultaneously, from a plurality of identical and/or preferentially different tool holders. In particular, the multi-clamping and measuring and/or presetting station is at least configured to at least partly simultaneously remove one tool from a tool holder and to fixate another tool in another tool holder. In particular, the multi-clamping and measuring and/or presetting station is at least configured to at least partly simultaneously remove one tool from a tool holder or to fixate a tool in a tool holder and to measure and/or preset another tool in another tool holder. By a process being "fully automated" is in particular to be understood that the process is free of any influence from an operator's side, in particular except for a starting and/or stopping of the process. The tools are in particular embodied as shaft tools, preferably as rotary shaft tools, for example drills, milling tools, profiling tools, and/or reamers, a shaft of such a shaft tool being preferably configured to be mounted in a tool holder.

By a "tool holder" is in particular a structural component to be understood which is configured to receive a tool and to connect the tool to a machine. In particular, the tool holder is configured as a tool-machine interface. Preferentially the tool holder is implemented as a tool-chuck, for example a shrink-clamp chuck, as a hydraulic-expansion chuck, as a compression-clamp chuck, as a collect chuck or the like. In particular, the multi-clamping and measuring and/or presetting station is configured at least for tool holders in sizes HSK 40 to HSK 100 and/or tool holders of other types, e.g. SK, Coromant Capto®, KM or the like. By a "tool clamping-in unit" is in particular a unit to be understood which is configured for a mounting of a tool in a tool holder and/or for a demounting of a tool from a tool holder. The tool clamping-in unit in particular forms a tool clamping-in and/or tool clamping-out unit. In particular, the tool clamping-in unit is configured to activate, in particular adjust, a clamping mechanism of a tool holder, and/or to deactivate, in particular release, the clamping mechanism of the tool holder. In particular, the multi-clamping and measuring and/or presetting station comprises at least a plurality of tool clamping-in units, wherein at least two tool clamping-in units may be implemented identically and/or may be configured for operation of an identical clamping mechanism, and/or wherein at least two tool clamping-in units may be implemented differently and/or may be configured for operation of different clamping mechanisms. It is for example conceivable that at least two tool clamping-in units, which are configured for operation of an identical clamping mechanism, are configured for different sizes of tool holders and/or for different tools. In particular, each tool clamping-in unit is configured exclusively for the operation of one single clamping mechanism. A "clamping mechanism" is in particular to mean a hydraulic-expansion clamping mechanism, a shrink-clamping mechanism, a collet chuck clamping mechanism or a compression-clamping mechanism, preferentially a clamping mechanism tensioned by means of a union nut. A "mounting" of a tool in a tool holder is in particular to mean an insertion of the tool in a tool receiving opening of the tool holder and a subsequent, substantially extraction-resistant, fixation of the tool in the tool holder. A "demounting" of a tool from a tool holder is in particular to mean a release of a force effecting a fixation of the tool in the tool holder and a removal of the tool out of the receiving opening of the tool holder.

By a "measuring" is in particular a detection and recordal of at least one parameter, preferably a plurality of parameters, of a tool unit to be understood, wherein the measuring data allow working out a characterization, preferably a comprehensive characterization, of the tool unit, which is in particular configured to be transmitted to a machine tool which the tool unit is to be mounted on. A "tool unit" in particular comprises a tool and a tool holder, with the tool preferably being mounted in the tool holder in an extraction-resistant manner. A "presetting" is in particular to mean a presetting of a relative position, in particular a relative rotational position and/or a relative longitudinal position, of a tool in a tool holder. In particular, in the presetting of the tool unit a total length of tool chuck and tool and/or an insertion depth of a tool in a tool chuck are/is defined. A "length adjustment" is in particular to mean a presetting of a total length of the tool holder with the tool fixated therein, and/or a presetting of an insertion depth of the tool in the tool receiving opening of the tool holder. "Configured" is in particular to mean specifically programmed, designed and/or equipped. By an object being configured for a certain function is in particular to be understood that the object fulfills and/or implements said certain function in at least one application state and/or operation state. By a "measuring and/or presetting apparatus for tools" is in particular an apparatus to be understood which is at least configured for an at least partial capture and/or adjustment at least a length, at least an angle, at least a contour and/or at least an outer shape of a tool.

By a "handling robot" is in particular an industrial robot to be understood, preferably an articulated-arm robot, in particular having at least three, preferentially at least four, preferably at least five and particularly preferably at least six robot joints which are movable independently from each other, and/or a handling device and/or a manipulator. The handling robot is in particular configured to manage a material flow from and/or to at least one work point. A "work point" may in particular be at least a portion of a structural component and/or of a component of the measuring and/or presetting apparatus and/or at least of a tool clamping-in unit, which is at least configured to carry out a functional work step. Preferentially the work point is a respective holder of the tool clamping-in unit or of the measuring and/or presetting apparatus for a tool holder or a tool holder inserted in a holder of the tool clamping-in unit or of the measuring and/or presetting apparatus. The handling robot in particular comprises at least one gripper unit, which is at least configured to grip a tool, a tool holder and/or an attachment holder. Preferably the handling robot comprises at least one robot controller unit. The robot controller unit in particular comprises a specifically programmed robot controller device, which is configured for a controlling, regulation and/or selection of activities and/or movements of the robot and/or of at least one sub-component of the handling robot. Preferentially the robot controller unit comprises at least one operator interface, in particular for influencing a movement of at least one sub-component of the robot and/or for influencing a programming of the robot controller device. Preferably the handling robot comprises at least one sensor unit for a determination of at least one environment parameter. The sensor unit may in particular comprise at least one force and/or momentum sensor, at least one sensor for electromagnetic waves, at least one sound sensor, at least one pressure sensor, at least one vibration sensor, at least one gyrosensor, at least one humidity sensor and/or at least one temperature sensor. In particular, the handling robot is configured to insert tools and tool holders into the tool clamping-in units and/or into the measuring and/or presetting apparatus or to remove tools and tool holders from the tool clamping-in units and/or from the measuring and/or presetting apparatus.

Beyond this it is proposed that the handling robot comprises at least one temperature sensor, preferably a plurality of temperature sensors, which is/are configured to determine a temperature of the tool and/or of the tool holder and to optimize a positioning process of the robot, e.g. of a tool holder or of a tool unit, in a holding device of a tool clamping-in unit. This advantageously allows achieving an especially high precision. It is in particular conceivable for at least one temperature sensor being allocated to at least one location in the multi-clamping and measuring and/or presetting station, preferably at least several locations in the multi-clamping and measuring and/or presetting station, for example at least the measuring and/or presetting apparatus or at least the shrink-clamping station. If a most precise information is available on the temperature of a tool unit and/or of the tool holder may advantageously allow a temperature-caused expansion of a material to be taken into account in a measuring by the measuring and/or presetting apparatus. It is for example advantageously possible that a length-change of a tool unit, which is yet to be expected until complete cooling-down of the tool unit, will be taken into account, with measuring data of the tool unit being corrected accordingly.

It is further proposed that the at least two, in particular fully automated, tool clamping-in units are embodied as different tool clamping-in units, which are at least configured for an automated, preferably fully automated mounting of tools in respectively different tool holders with respectively different clamping methods, and/or for an automated, preferably fully automated demounting of tools from respectively different tool holders with respectively different clamping methods. This advantageously allows achieving an especially high degree of flexibility. Advantageously a single mounting station may be used for different types of tool chucks. It is in this way possible to advantageously save space, time and/or personnel. Moreover advantageously something like a "black box" can be created for a mounting of tools in tool holders, which is in particular operable without special knowledge of different types of tool chucks or clamping mechanisms. This advantageously allows providing a high level of user-friendliness.

Furthermore it is proposed that the tool clamping-in units, in particular the tool clamping-in units for tool holders with different clamping methods, are implemented separately, in particular completely separately, from each other. In this way a high degree of flexibility is advantageously achievable. In particular, it is advantageously possible to facilitate parallel operation of a plurality of tool clamping-in units, as a result of which a particularly high work speed is advantageously achievable. Moreover this advantageously allows flexible combination of different tool clamping-in units within the multi-clamping and measuring and/or presetting station, for example respectively adapted to numbers of tool holders of certain types which are to be expected. A modular construction may advantageously be made possible. By the tool clamping-in units being implemented "separately" from each other is in particular to be understood that different tool clamping-in units, in particular with the exception of connection elements for a mounting of the separate tool clamping-in units with each other, are free of shared structural components, preferably of shared functional structural components, which are directly or indirectly part of carrying out a tool clamping-in process or of a tool clamping-out process. Tool clamping-in units which are implemented separate from each other preferably realize tool clamping-in units which are, in particular completely, functional independently from each other. In particular, tool clamping-in units which are implemented separate from each other are configured to work, preferably to carry out tool clamping-in processes or tool clamping-out processes, simultaneously or in temporally overlapping periods. In particular, the positions of separate tool clamping-in units are interchangeable within the multi-clamping and measuring and/or presetting station in any regard and without affecting the respective functionalities. In particular, the tool clamping-in units form modules which are separate from each other.

It is also proposed that the multi-clamping and measuring and/or presetting station comprises at least one third tool clamping-in unit for tool holders with a third clamping method which differs from the clamping methods that can be carried out by the two other tool clamping-in units. This advantageously allows achieving an even higher degree of flexibility.

Beyond this it is proposed that the multi-clamping and measuring and/or presetting station comprises at least one fourth tool clamping-in unit for tool holders with a fourth clamping method which differs from the clamping methods that can be carried out by the three other tool clamping-in units. This advantageously allows achieving an even higher degree of flexibility.

If the tool clamping-in units and the measuring and/or presetting apparatus are arranged at least section-wise around the handling robot, a high degree of flexibility is advantageously achievable. In particular, it is advantageously possible for the handling robot to be arranged in such a way that it is capable of loading all the tool clamping-in units as well as the measuring and/or presetting apparatus. Advantageously a high efficiency is achievable. Advantageously this allows realizing the multi-clamping and measuring and/or presetting station in an especially compact manner. By objects, in particular tool clamping-in units and/or measuring and/or presetting apparatuses, being arranged "section-wise around" another object, in particular a handling robot, is to be understood that the other object is surrounded by the objects on more than one side, preferably on at least two sides, preferentially on at least three sides and particularly preferably on four sides. In particular, the objects which are arranged section-wise around the other object are not arranged linearly in a single row. It is however conceivable for the objects to be arranged in two rows situated at an angle to one another, or that the objects form two directly opposite-situated rows, in a center of which the other object is arranged. In particular, the objects which are arranged section-wise around the other object are arranged at least section-wise along a curved path, for example along a circular path and/or along an at least section-wise angled path, e.g. along a path comprising one angle or a plurality of angles. The tool clamping-in units and the measuring and/or presetting apparatus are preferentially arranged in an oval, in a circle or preferably in a rectangle around the handling robot. In particular, the tool clamping-in units, the measuring and/or presetting apparatus and the handling robot are arranged in a shared plane. It is however also conceivable that the at least two tool clamping-in units are stacked vertically one above the other.

Further it is proposed that the multi-clamping and measuring and/or presetting station comprises a shared housing which encloses at least the handling robot, the tool clamping-in units and the measuring and/or presetting apparatus, at least to a large extent. This advantageously allows achieving a high level of work safety. Moreover a particularly compact implementation of the multi-clamping and measuring and/or presetting station is advantageously possible. A "large extent" is in particular to mean, in this context, 51%, preferentially 60%, advantageously 70%, preferably 80% and particularly preferably 90%. In particular, the housing encloses the multi-clamping and measuring and/or presetting station to a large extent at least on four sides, preferably at least on five sides and preferentially at least on six sides.

It is also proposed that the housing comprises a flap that can be opened and permits access to the measuring and/or presetting apparatus and permits manual operation of the measuring and/or presetting apparatus, in particular from outside the housing. This advantageously allows achieving a particularly high degree of flexibility. Advantageously it is thus possible to allow selection between manual and automatic operation of the measuring and/or presetting apparatus. This may be advantageous in particular if an operator wishes to put in a manual measurement in between, for example if he wishes to quickly check a tool unit or if he wishes to make a measurement of a certain tool unit in advance. Advantageously, as a result of this an operator does not require a further separate measuring and/or presetting apparatus in place, which allows saving costs and/or keeping space requirements low. In particular, when the flap is opened the multi-clamping and measuring and/or presetting station automatically switches into a manual mode and/or pauses all currently running processes. It is alternatively conceivable that an opening of the flap is only permitted if all currently running processes of the tool clamping-in units and/or of the measuring and/or presetting apparatus are finished and/or paused, and/or if the measuring and/or presetting apparatus is free, i.e. there is no tool holder in the measuring and/or presetting apparatus. Alternatively it is conceivable that by an opening of the flap only a loading of the measuring and/or presetting apparatus by the handling robot is prevented while the tool clamping-in units continue to be loaded and operated in an automated manner.

Beyond this it is proposed that the multi-clamping and measuring and/or presetting station has a modular construction. This advantageously allows achieving a high degree of flexibility. In particular, it is advantageously possible to flexibly adapt a composition of he multi-clamping and measuring and/or presetting station to different specifications, customers' wishes and/or requirements at a location of use. For example, the number and type(s) of tool clamping-in units is freely selectable. Moreover a simple conversion, in particular a simple upgrade or downgrade, of the multi-clamping and measuring and/or presetting station is advantageously possible. This advantageously allows achieving especially easy mounting or demounting. Due to the modular construction it is in particular possible to combine the types and/or positions of the tool clamping-in units in any desired manner. However, the measuring and/or presetting apparatus advantageously always remains in the position of the housing in which the flap is located. The tool clamping-in units and/or the measuring and/or presetting apparatus in particular realize modules which are formed in such a way that they are couplable with one another in any required way. In particular, each module has a uniform width. In particular, each module has a uniform depth. In particular, each module has a uniform height. In particular, the functional units of each module, i.e. in particular the clamping devices of the tool clamping-in units implementing the respective clamping mechanism and/or the measuring and/or presetting devices of the measuring and/or presetting apparatus, are situated at a uniform height. In particular, each module comprises at least one support surface which is configured to receive the respective functional unit, with the support surfaces being situated at uniform heights respectively. In particular it is conceivable that at least one tool clamping-in unit, at least the measuring and/or presetting apparatus and/or the handling robot are/is composed of at least two or more modules. By a "module" is in particular a technical unit to be understood that is capable of being combined with other units to form an entirety, in particular of the multi-clamping and measuring and/or presetting station, that is of higher quality. In particular, individual modules may be combined into an entirety in different ways, depending on requirements and/or on customers' wishes. However, in particular the individual modules are already functional on their own. In particular, the individual modules are capable of operating independently from one another. Advantageously the modules realize structural components of a construction kit system. Advantageously a module constitutes an exchangeable complex element within a whole system and realizes a closed functional unit. In particular, in the modular construction a system, in particular the multi-clamping and measuring and/or presetting station, is composed of structural components, in particular the tool clamping-in units, the measuring and/or presetting apparatus and/or the handling robot, along defined points, in particular defined interfaces. In particular, the interfaces of all modules are embodied such that they are identical to each other and/or compatible with each other.

If at least an arrangement at least of part of the components of the multi-clamping and measuring and/or presetting station within the housing, i.e. for example of the individual tool clamping-in units, is module-wise selectable and/or module-wise modifiable, a particularly high degree of flexibility is advantageously achievable.

If moreover at least a combination at least of part of the components of the multi-clamping and measuring and/or presetting station within the housing, i.e. for example the individual tool clamping-in units, is module-wise selectable and/or module-wise modifiable, a particularly high degree of flexibility is advantageously achievable.

It is further proposed that at least one tool clamping-in unit is embodied as a shrink-clamping station, which is in particular configured for a mounting/demounting of tools into/out of (a) shrink-clamp chuck(s) by inductive heating. This advantageously allows achieving a high degree of flexibility, in particular as this facilitates at least a shrink-clamping of tools in tool holders by means of the multi-clamping and measuring and/or presetting station, preferably in a combination with a presetting and/or measuring of the produced tool units, the shrink-clamping preferentially constituting one of several different clamping methods that can be managed by the multi-clamping and measuring and/or presetting station. The shrink-clamping station is in particular configured to fixate a tool in a tool holder, in particular by shrink-clamping, and/or to remove a tool from the tool holder, in particular by unshrink-unclamping. Preferentially the shrink-clamping station comprises at least one induction—coil unit for heating a tool receiving region—of a tool holder that surrounds a tool receiving opening. The shrink-clamping station is in particular configured, in a shrink-clamping, for a thermal expansion of the tool receiving opening of the tool holder to increase a size, in particular a diameter, of the tool receiving opening in such a way that a tool fits in the tool receiving opening. Preferably due to a following cooling down of the tool holder the size, in particular the diameter, of the tool receiving opening is decreased once again, thus creating a force-fit connection between the tool holder and the tool. Preferentially the shrink-clamping station comprises at least one cooling station. The cooling station is at least configured, in particular following a heating by the induction coil unit, to cool the tool holder down, preferably to a lukewarm temperature. In particular, the handling robot is configured for a loading of the shrink-clamping station, i.e. in particular an insertion of tools and/or tool holders in the shrink-clamping station and/or a removal of tools and/or tool holders from the shrink-clamping station.

Beyond this it is proposed that the shrink-clamping station, in particular the heating station, comprises a tool holder recognition unit that is configured for an automated recognition of tool holders which are not embodied as shrink-clamp chucks and for preventing an insertion of tool holders in the shrink-clamping station which are not embodied as shrink-clamp chucks. In this way a particularly high level of operational safety is advantageously achievable. For example, a hydraulic-expansion chuck erroneously inserted in the heating station could explode when heated, thus causing damages and injuries, which is advantageously preventable by a recognition of the tool holder type prior to heating. The tool holder recognition—unit is in particular implemented at least partly integrally with a recognition unit of the multi-clamping and measuring and/or presetting station that is allocated to a gate unit of the multi-clamping and measuring and/or presetting station, or is implemented as a unit that is separate from the recognition unit, comprising separate recognition means. The recognition means may in particular be realized as a camera system with a tool holder recognition, as an NFC transponder system, e.g. an RFID transponder system, in particular with an RFID reading device at the shrink-clamping station and an RFID tag on the tool holder, and/or as a QR-code system or barcode system, in particular with a QR-Code reading device or barcode reading device at the shrink-clamping station and with a QR Code or a barcode on the tool holders. By two units being implemented "partly integrally" is in particular to be understood that the units comprise at least one, in particular at least two, advantageously at least three shared elements, in particular recognition means, which is/are (a) component(s), in particular functional relevant component(s), of both units.

In addition it is proposed that the shrink-clamping station comprises the cooling station, which is configured for a simultaneous cooling of a plurality of tool holders, in particular shrink-clamp chucks. This advantageously allows achieving a particularly high degree of flexibility, in particular as shrink-clamp chucks of different types and/or different shapes can be cooled effectively. Moreover a high work speed is advantageously achievable, in particular as a cooling process usually takes longer than a heating process and therefore a further shrink-clamp chuck can already be heated while the preceding shrink-clamp chuck(s) is/are still in the cooling phase. The cooling station in particular constitutes a portion of the same module as the shrink-clamping station. However, preferentially the cooling station implements its own module, which is in particular separate from the shrink-clamping station. In particular, the cooling station is configured for an active cooling of tool units. In particular, the cooling station comprises a plurality of cooling places, each of which is configured for an active cooling of exactly one tool unit. In particular, the cooling station comprises a plurality of cooling cuffs which can be placed upon respectively one heated tool unit for cooling. In particular, the handling robot is configured for a loading of the cooling station, which in particular means an insertion of tool units and/or tool holders in the cooling station and/or a removal of tool units and/or tool holders out of the cooling station. The handling robot is moreover in particular configured for picking up, moving and setting down cooling cuffs. Preferentially the handling robot is configured to place cooling cuffs on tool holders and/or tool units and/or to remove cooling cuffs from tool holders and/or tool units.

Furthermore it is proposed that the shrink-clamping station comprises a cooling station and a heating station which are implemented as respectively separate modules, which are arrangeable in any module places within a housing of the multi-clamping and measuring and/or presetting station. This advantageously allows further increasing flexibility and/or work speed. In particular, the multi-clamping and measuring and/or presetting station comprises at least 8, preferably at least 12, preferentially at least 16 and especially preferentially no more than 20 module places. Alternatively the cooling station and the heating station may form a shared single module, which in particular requires maximally one module place. Herein in particular a cooling unit of the cooling station and a heating unit of the heating station are combined in a shared structural unit, in particular implemented to be only movable together, which is in particular described in the German patent application having the application number 10 2019 108 605.1. In particular, by referring to the German patent application 10 2019 108 605.1 its disclosure is adopted into the present patent application, preferably with the exception of possible definitions, exclusions and/or inconsistencies.

It is also proposed that at least one tool clamping-in unit is embodied as a compression-clamping station, in particular a powRgrip® clamping station, which is at least configured for mounting tools in the tool holders via pressing of the tool holders. This advantageously allows achieving a high degree of flexibility, in particular as it is possible at least for a compression-clamping of tools in tool holders, in particular in powRgrip® tool holders, to be enabled by the multi-clamping and measuring and/or presetting station, preferably in a combination with a presetting and/or measuring of the produced tool units, preferentially constituting one of several different clamping methods that can be managed by the multi-clamping and measuring and/or presetting apparatus. The compression-clamping station is in particular configured to press a collet chuck of a tool holder, in particular a powRgrip® collet chuck of a powRgrip® tool holder, into a collet chuck holder of the tool holder, in particular a powRgrip® collet chuck holder of the powRgrip® tool holder, in particular while a shaft tool is arranged in the collet chuck holder. In particular, the handling robot is configured to insert the tool holder, in particular the collet chuck and the collet chuck holder of the tool holder, into the compression-clamping station. In particular, the handling robot is configured to introduce the tool into the collet chuck that is arranged in the compression-clamping station. In particular, the handling robot is configured to close the compression-clamping station to permit an execution of the clamping process and/or to open the compression-clamping station for a removal of the mounted tool unit or of the demounted tool holder. In particular, the handling robot is configured to remove the mounted tool unit and/or the demounted tool holder out of the compression-clamping station. In particular, the handling robot is configured to select a compression adapter of the compression-clamping station that is suitable for a certain tool holder and to mount the compression adapter in the compression-clamping station prior to a clamping-in or clamping-out process. The compression-clamping station is in particular realized as an "Automatische Spanneinheit PGU" [automatic clamping unit PGU] of the company Rego-Fix AG, Tenniken (Switzerland).

Beyond this it is proposed that, in an interaction with the measuring and/or presetting apparatus, the compression-clamping station is configured for a length adjustment of a tool in a powRgrip® tool holder. This advantageously allows achieving a high degree of flexibility. For this purpose, in particular, first the tool holder, in particular the powRgrip® tool holder with the collet chuck, in particular the powRgrip® collet chuck, with the collet chuck holder, in particular the powRgrip® collet chuck holder, and with the tool inserted in the tool holder, is inserted in the measuring and/or presetting apparatus and is there adjusted to a nominal length by means of a length-adjustment pin of the measuring and/or presetting apparatus and by means of an optical unit of the measuring and/or presetting apparatus, in particular a camera system of the measuring and/or presetting apparatus. Then in particular the tool unit which consists of the collet chuck, the collet chuck holder and the tool, and which has been preset to length, is transferred to the compression-clamping station and is fixated in the adjusted position by the compression-clamping station. In a further step, following the fixation by the compression-clamping station, in particular the length adjustment is controlled by means of the measuring and/or presetting apparatus. In particular if the length adjustment of the fixated tool unit differs from the pre-set length adjustment of the tool unit prior to the fixation, the tool unit is once again demounted and the process is repeated.

In addition it is proposed that at least one tool clamping-in unit is embodied as a hydraulic-expansion screw-driving station, which is in particular configured for a mounting/demounting of tools in/out of a hydraulic-expansion chuck by a tightening/releasing of a clamping screw of the hydraulic-expansion chuck. In this way a high degree of flexibility is advantageously achievable, in particular as enabling at least of a clamping-in and/or clamping-out of tools in hydraulic-expansion chucks by means of the multi-clamping and measuring and/or presetting station is facilitated, in particular in a combination with a presetting and/or measuring of the produced tool units, preferentially constituting one of several different clamping methods manageable by the multi-clamping and measuring and/or presetting station. In particular, the hydraulic-expansion screw-driving station is configured to operate different clamping screws of different hydraulic-expansion chucks. In particular, the hydraulic-expansion screw-driving station is implemented at least partly integrally with the measuring and/or presetting apparatus. In particular, the hydraulic-expansion screw-driving station is mounted on the measuring and/or presetting apparatus. In particular, the hydraulic-expansion screw-driving station and the measuring and/or presetting apparatus occupy one single, in particular an identical, module place. In particular, the hydraulic-expansion screw-driving station is configured for manipulating a tool holder that is inserted in a holder device of the measuring and/or presetting apparatus and/or is fixated therein.

If the hydraulic-expansion screw-driving station comprises a screw head magazine containing a plurality of screw heads with different shapes and/or different sizes, with the hydraulic-expansion screw-driving station being configured to carry out an automated exchange of the active screw head, a high degree of flexibility is advantageously achievable, in particular as it is possible for different clamping screws of different hydraulic-expansion chucks to be operated, i.e. in particular to be tensioned or released. In particular, the handling robot is configured for an insertion of the hydraulic-expansion chuck and/or of the tool in the hydraulic-expansion screw-driving station and/or for a removal of the hydraulic-expansion chuck and/or of the tool out of the hydraulic-expansion screw-driving station. In particular, the handling robot is configured for a tightening or a releasing of the clamping screw of the hydraulic-expansion chuck. In particular, the handling robot is configured to take a screw head from the screw head magazine and/or to insert a screw head into the screw head magazine. In particular, the handling robot is configured for an exchange of a screw head of the hydraulic-expansion screw-driving station. Alternatively the handling robot may be configured to operate the clamping screw directly, i.e. to operate a screw head for a tensioning or a releasing of the clamping screw. However, preferably a screw-driving unit, which is configured to induce a rotation of the screw head for an operation of the clamping screw, is implemented separately from the handling robot. An "active screw head" is in particular to mean the respective screw head which is fixated in the hydraulic-expansion screw-driving station, which is currently rotatable by the hydraulic-expansion screw-driving station and which is thus in particular situated outside the screw head magazine. In particular, the screw head magazine is fixated on the measuring and/or presetting apparatus.

Furthermore it is proposed that at least one tool clamping-in unit is embodied as a union nut screw-driving station which is configured for a mounting/demounting of tools in/from a tool holder by a tightening/releasing of a union nut. This advantageously allows achieving a high degree of flexibility, in particular as at least enabling of a clamping-in and/or clamping-out of tools in collet chucks with union nuts by the multi-clamping and measuring and/or presetting station is possible, preferably in a combination with a presetting and/or measuring of the produced tool units, preferentially constituting one of several different clamping methods which are manageable by the multi-clamping and measuring and/or presetting station. In particular, a collet chuck that is tensionable by the union nut screw-driving station comprises a union nut which is in particular, for a clamping-in of a tool, put over the tool and is screwed with a portion of the collet chuck which the tool is inserted in and which has a tool receiving opening. In particular, the union nut screw-driving station comprises at least one torque element, which is configured to engage around the union nut and to tighten and/or release the union nut by a rotation movement of the torque element or of the portion of the collet chuck comprising the tool receiving opening. In particular, the handling robot is configured to insert a tool holder and/or a tool into the union nut screw-driving station and/or to remove a tool holder and/or a tool from the union nut screw-driving station. In particular, the handling robot is configured to remove a union nut from the tool holder or to place a union nut onto the tool holder. In particular, the handling robot is configured to lay the torque element onto the union nut and/or to remove it from the union nut.

If the union nut screw-driving station is configured for a fully automated tightening and/or releasing of a tool-surface-free union nut, in particular a cylindrically-shaped union nut, a flexibility is advantageously augmentable even further. Advantageously this allows a tensioning and/or releasing of tool chucks with tool-surface-free union nuts. By a "tool-surface-free union nut" is in particular a union nut to be understood that is on its outer circumference free of pre-formed surfaces, e.g. key surfaces, edges, holes, slits or the like, which are configured to provide an engagement possibility for tools, for example screw wrenches, or the like. In particular, a tool-surface-free union nut of a tool holder has a substantially smooth surface which is in particular, for the purpose of optimizing a true running of the tool holder, as rotationally symmetrical to a rotation axis of the tool holder as possible. An exemplary union nut screw-driving station has been described in the German patent application having the application number 10 2018 116 263.4, wherein in particular, by referring to the German patent application 10 2018 116 263.4, its disclosure is adopted into the present patent application, preferably with the exception of possible definitions, exclusions and/or inconsistencies.

It is also proposed that the multi-clamping and measuring and/or presetting station comprises at least one cleaning station, which is configured for cleaning at least a portion of the tool prior to a mounting in the tool holder or prior to a demounting of the tool from the tool holder. This advantageously allows further increasing flexibility, for example as even contaminated tool units can be demounted in the multi-clamping and measuring and/or presetting station. Moreover an especially high precision of an adjustment and/or a measuring is advantageously achievable in this way. Further a particularly high level of operational safety is achievable. In particular, the handling robot is configured for an insertion of tools and/or tool units in the cleaning station and/or to remove tools and/or tool units from the cleaning station. In particular, the cleaning station comprises at least one steam spray nozzle, which is preferentially configured to spray the tool and/or the tool holder, preferably at least a cutter of a tool, with steam for cleaning purposes. Alternatively or additionally the cleaning station comprises a blotting device, which is configured for blotting the tool and/or the tool holder, preferably at least a cutter of a tool, with an adhesive material for cleaning purposes. Such a blotting device has been described, for example, in the German patent application with the application number 10 2018 113 704.4, wherein in particular, by referring to the German patent application 10 2018 113 704.4, its disclosure is adopted into the present patent application, preferably with the exception of possible definitions, exclusions and/or inconsistencies.

If the measuring and/or presetting apparatus is at least configured for an optical examination of a cleanliness of a portion of a tool that has been cleaned in the cleaning station, a particularly high measuring precision and/or a particularly high adjustment precision are/is achievable. In particular, the measuring and/or presetting apparatus is configured for an optical examination of a tool unit and/or of a tool before and after a cleaning by the cleaning station. An "optical examination" is in particular to mean a comparison of image recordings of an optical sensor system, e.g. a camera. In particular, the cleaning station is configured to repeat the cleaning process in case insufficient cleanliness has been stated.

Beyond this it is proposed that the multi-clamping and measuring and/or presetting station comprises at least one balancing station, which is configured for a determination, in particular by a rotation of a tool mounted in one of the tool clamping-in units with a tool holder, of an imbalance of a combination of tool and tool holder, in particular of a tool unit. This advantageously allows achieving a high balancing quality and/or a high clamping-in precision. In particular, a high precision, i.e. for example a high machining precision, of the ready-clamped tool units can be obtained. Due to high balancing quality, it is advantageously possible to extend a service life of a tool unit and/or to go easy on a machine tool, in particular a spindle of a machine tool. In particular, the handling robot is configured to insert a ready-mounted tool unit in the balancing station and/or to remove a ready-mounted tool unit from the balancing station. In particular, the multi-clamping and measuring and/or presetting station is configured, in case a tolerated imbalance is exceeded, to demount a respective tool unit in the respectively suitable tool clamping-in unit and to re-mount it, wherein an imbalance of the re-mounted tool unit is then preferably measured once again. In particular if the tolerated imbalance is then undershot, the tool unit is released for further use by the multi-clamping and measuring and/or presetting station. In particular if the tolerated imbalance is then once more exceeded, the tool unit is once again demounted and re-mounted or discarded by the multi-clamping and measuring and/or presetting station. In particular, tool units and/or tool holders with insufficient balancing quality and/or with insufficient or non-satisfactory measuring data determined by the measuring and/or presetting apparatus are marked, for example in an operation software of the multi-clamping and measuring and/or presetting station or on a chip assigned to the tool holder, and are discharged. Alternatively or additionally, in case of a multiple exceeding of the tolerated imbalance of a tool unit, the tool/the tool holder of the respective tool unit may be combined with another tool holder/tool for the purpose of identifying the cause of the imbalance.

Beyond this it is proposed that the measuring and/or presetting apparatus comprises an attachment holder magazine to provide a plurality of different attachment holders. This advantageously allows increasing flexibility, in particular as different types of tool holders, preferably differently shaped tool holders, can be measured and/or preset by a single measuring and/or presetting apparatus. In particular, an attachment holder is configured to support a tool holder in the measuring and/or presetting apparatus, preferentially in a stationary and/or rotationally fixed manner, relative to a measuring device and/or relative to a presetting device of the measuring and/or presetting apparatus. In particular, the different attachment holders are configured for holding differently shaped tool holders. In particular, the handling robot is configured to remove an attachment holder out of the measuring and/or presetting apparatus and/or out of the attachment holder magazine, and/or to insert an attachment holder in the measuring and/or presetting apparatus and/or in the attachment holder magazine. In particular, the attachment holder magazine is arranged within the housing, allowing the handling robot permanent access to all available attachment holders. Alternatively it is conceivable that the attachment holder magazine is arranged outside the housing and different attachment holders may be conveyed to the handling robot via the gate unit.

If the multi-clamping and measuring and/or presetting station comprises a tool assembly station which is configured for a mounting and/or demounting of tools that are composed of several parts and/or modules, an especially high level of flexibility is advantageously achievable. The tool assembly station may for example be configured for a loading of tools with indexable inserts and/or for a mounting of tool extensions.

Further it is proposed that the multi-clamping and measuring and/or presetting station comprises the recognition unit which is configured for a recognition of a tool holder, and comprises a control and/or regulation unit that is configured, on the basis of the data determined by the recognition unit, to prepare at least one tool clamping-in unit and then to prompt the handling robot to convey the tool holder to the prepared tool unit for a mounting/demounting of a tool into/from the tool holder. This advantageously allows achieving a particularly high degree of automatization. Advantageously an especially high level of user-friendliness is achievable. Moreover high operational safety is advantageously achievable as it is possible, at an early stage, to sort out tools and/or tool holders which are incompatible with the configuration of the multi-clamping and measuring and/or presetting station. "Preparing of a tool clamping-in unit" is in particular to mean an insertion of an adapter that is suitable for the respective tool holder and is necessary for an appropriate functionality of the tool clamping-in unit, e.g. a screw head, a torque element, a compression adapter, a collet chuck, or the like. The recognition unit is in particular realized as a camera system with a tool recognition and/or tool holder recognition, as an NEC transponder system, for example an REID transponder system, in particular with an RFID reading device at the gate unit of the housing and an RFID tag on the tool holders and/or on the tools, and/or as a QR-code system or barcode system, in particular with a QR-code reading device or barcode reading device at the gate unit of the housing and a QR code or a barcode on the tool holders and/or on the tools. Alternatively it is conceivable that the QR-code system or barcode system is free of a separate QR-code reading device or a barcode reading device at the gate unit and the QR codes or barcodes are read out by a camera system of the measuring and/or presetting apparatus. For this purpose, the handling robot is in particular configured for a positioning of the tool and/or the tool holder with the QR code or the barcode in a field of vision of the camera system of the measuring and/or presetting apparatus. By a "control and/or regulation unit" is in particular a unit to be understood that comprises at least one control electronics part. By a "control electronics part" is in particular a unit to be understood with a processor unit and with a memory unit and with an operation program stored in the memory unit.

It is also proposed that the housing comprises at least the gate unit which is configured for a loading and/or unloading of tools and/or tool holders, with the gate unit comprising at least one signal device that is configured to output to an operator at least one signal by which it may be perceived whether ready-mounted combinations of tool and tool holder, in particular tool units, which are situated in the gate unit, have been assembled correctly. This advantageously allows achieving a particularly high level of user-friendliness. Moreover high operational safety is achievable, in particular as it is possible to prevent further use of faulty or faultily assembled tool units. The gate unit is in particular implemented as a closable opening in the housing. The gate unit in particular serves as a transfer region for a transfer of tools and tool holders to the handling robot. The handling robot is configured to remove tools and/or tool holders out of the gate unit or to deposit tools and/or tool holders in the gate unit. In particular, an access of the handling robot to the gate unit is prevented while the gate unit is open towards an operator's side, i.e. on an outer side of the housing. The signal device is in particular embodied as an acoustical signal device and is preferably embodied as an optical signal device.

If the signal device is implemented as a luminaire unit, which is configured to output light signals in at least two different light colors, it is advantageously possible to further augment user-friendliness, in particular by way of an especially simple recognizability of a signalized state. Alternatively or additionally the signal device may be configured to display an operation state (for example "switched on", "standby", "ready for operation", "error", "running operation", "order completed") of the multi-clamping and measuring and/or presetting station.

In addition, a method is proposed for a mounting/demounting of a tool into/from a tool holder, with a multi-clamping and measuring and/or presetting station, the method advantageously providing an especially high flexibility.

If in the method a tool holder is recognized in an at least partly automated manner and is then fully-automatedly conveyed to a suitable tool clamping-in unit from a plurality of tool clamping-in units, it is moreover advantageously possible to achieve a particularly high level of user-friendliness and/or to prevent malfunction.

The multi-clamping and measuring and/or presetting station according to the invention and the method according to the invention are herein not to be limited to the application and implementation described above. In particular, to fulfill a functionality herein described, the multi-clamping and measuring and/or presetting station according to the invention and the method according to the invention may comprise a number of individual elements, structural components and units that differs from a number that is mentioned here.

DRAWINGS

Further advantages will become apparent from the following description of the drawings. The drawings show an exemplary embodiment of the invention. The drawings, the description and the claims contain a plurality of features in combination. Someone skilled in the art will purposefully also consider the features individually and will find further expedient combinations.

Figure 2:
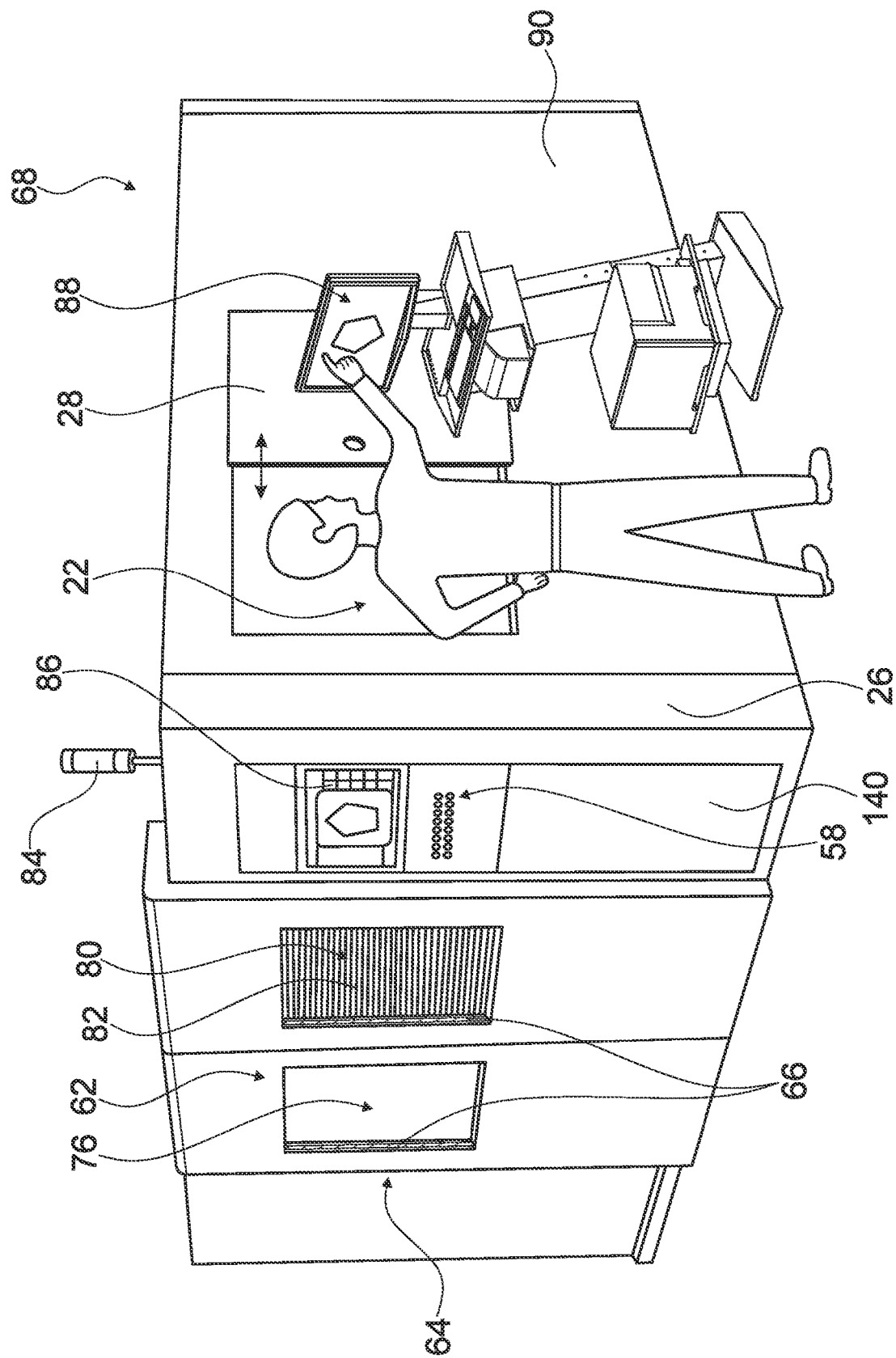
Figure 3:
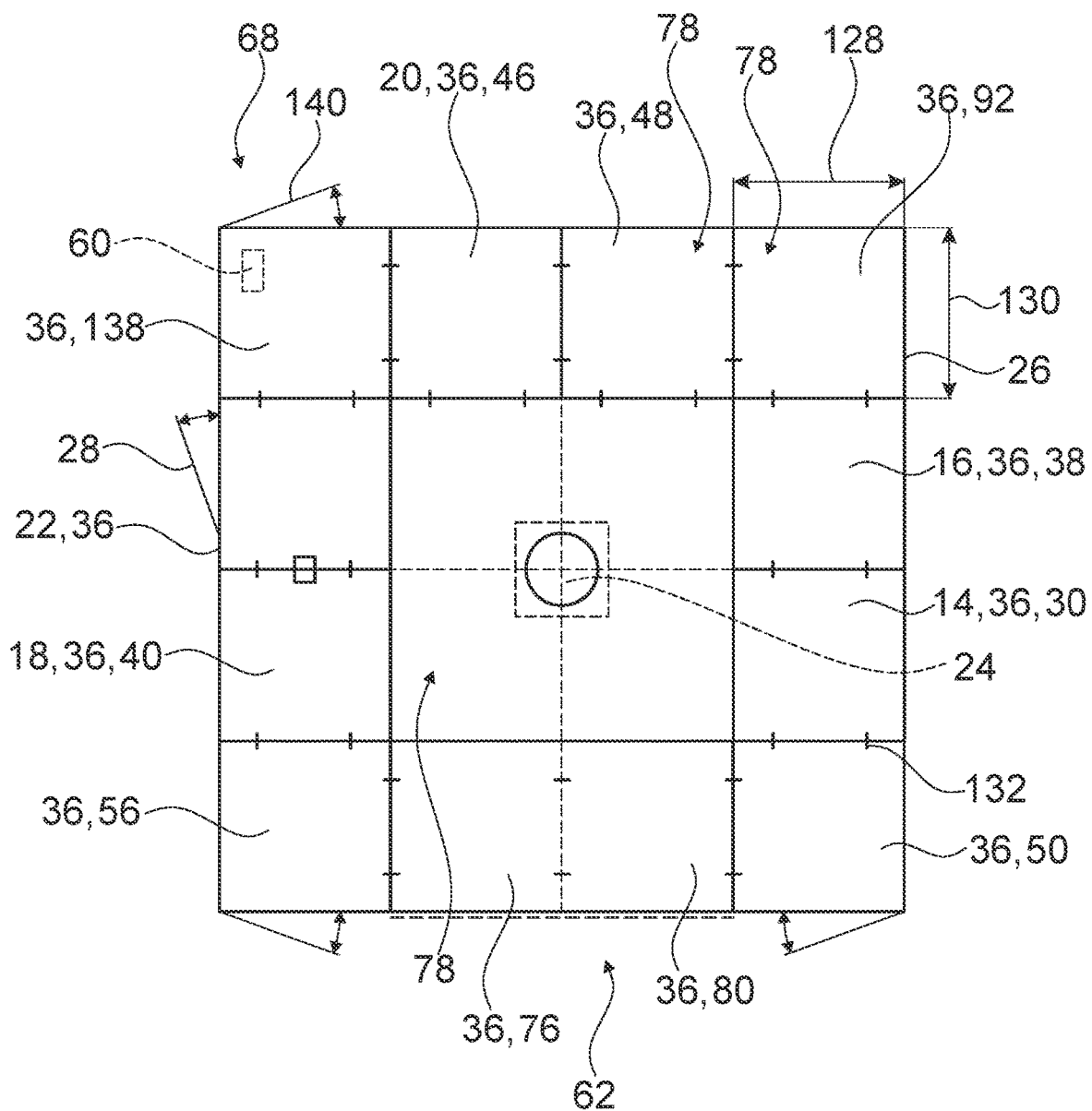
Figure 4:
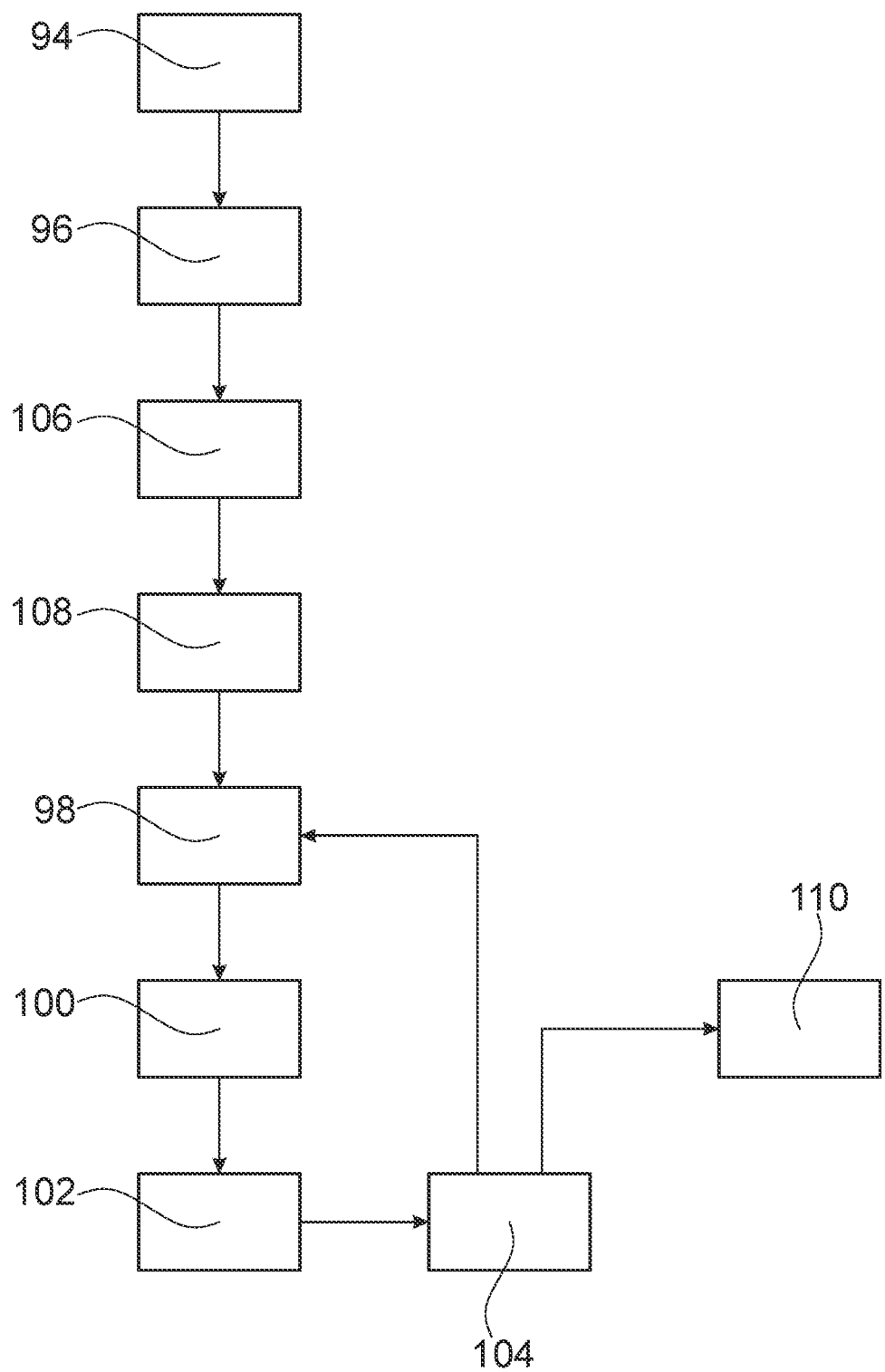
Figure 5:
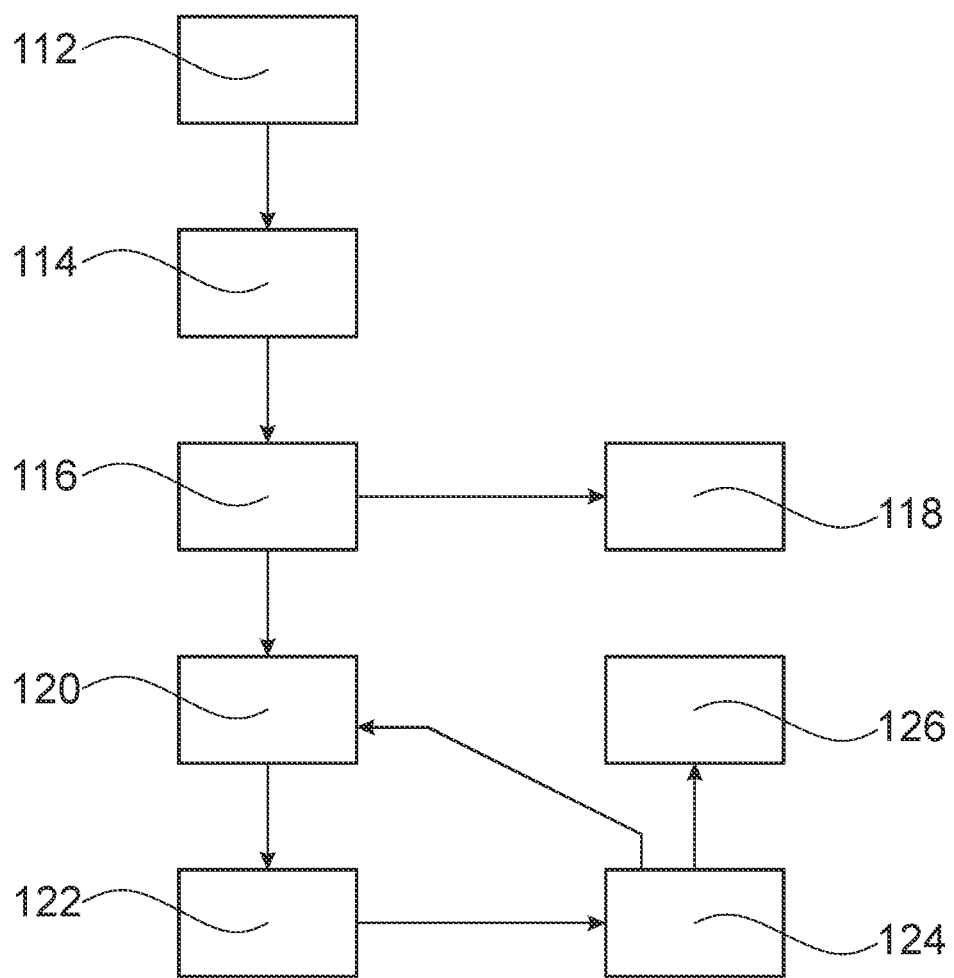
Figure 6:
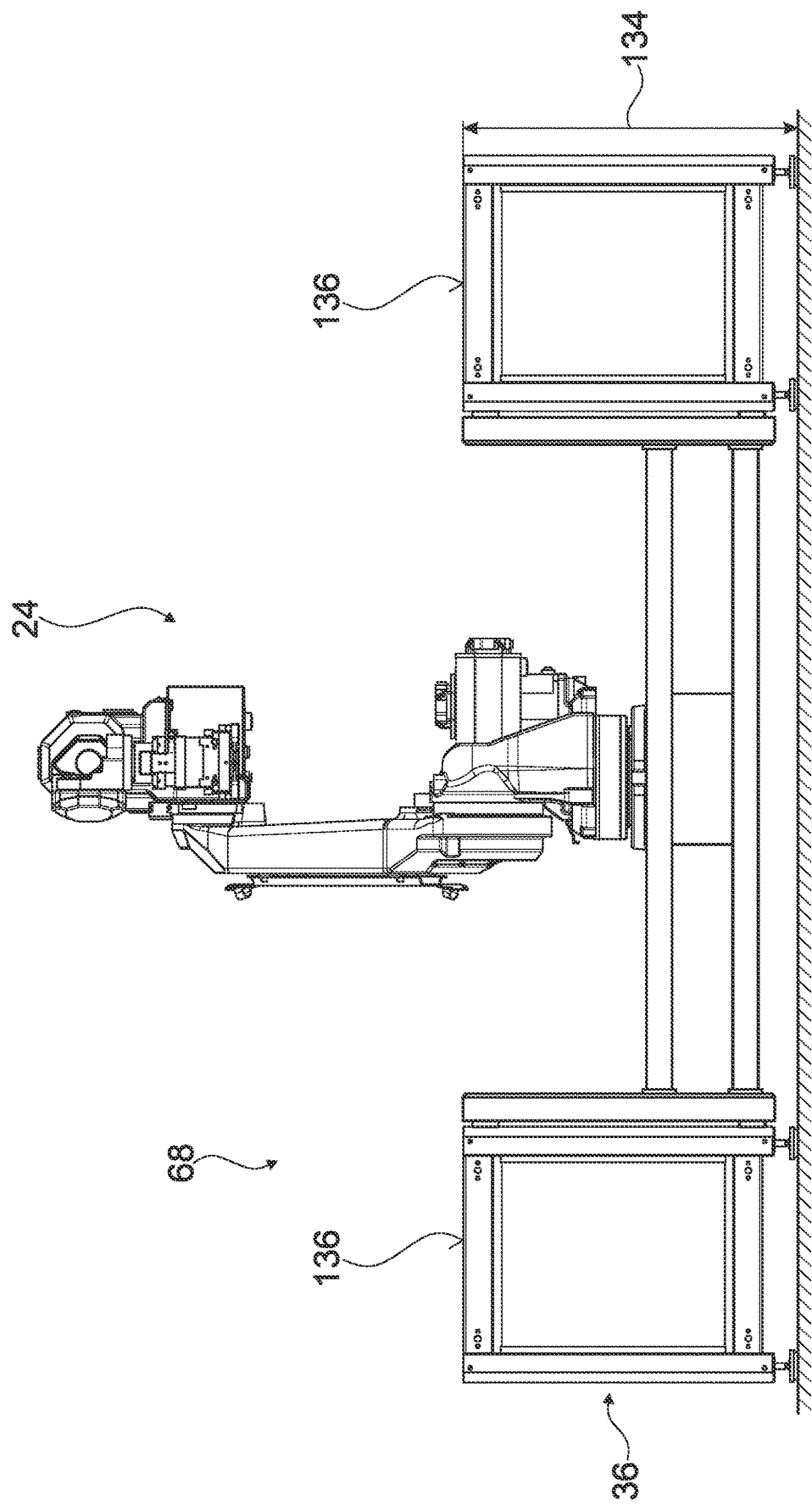
Figure 7:
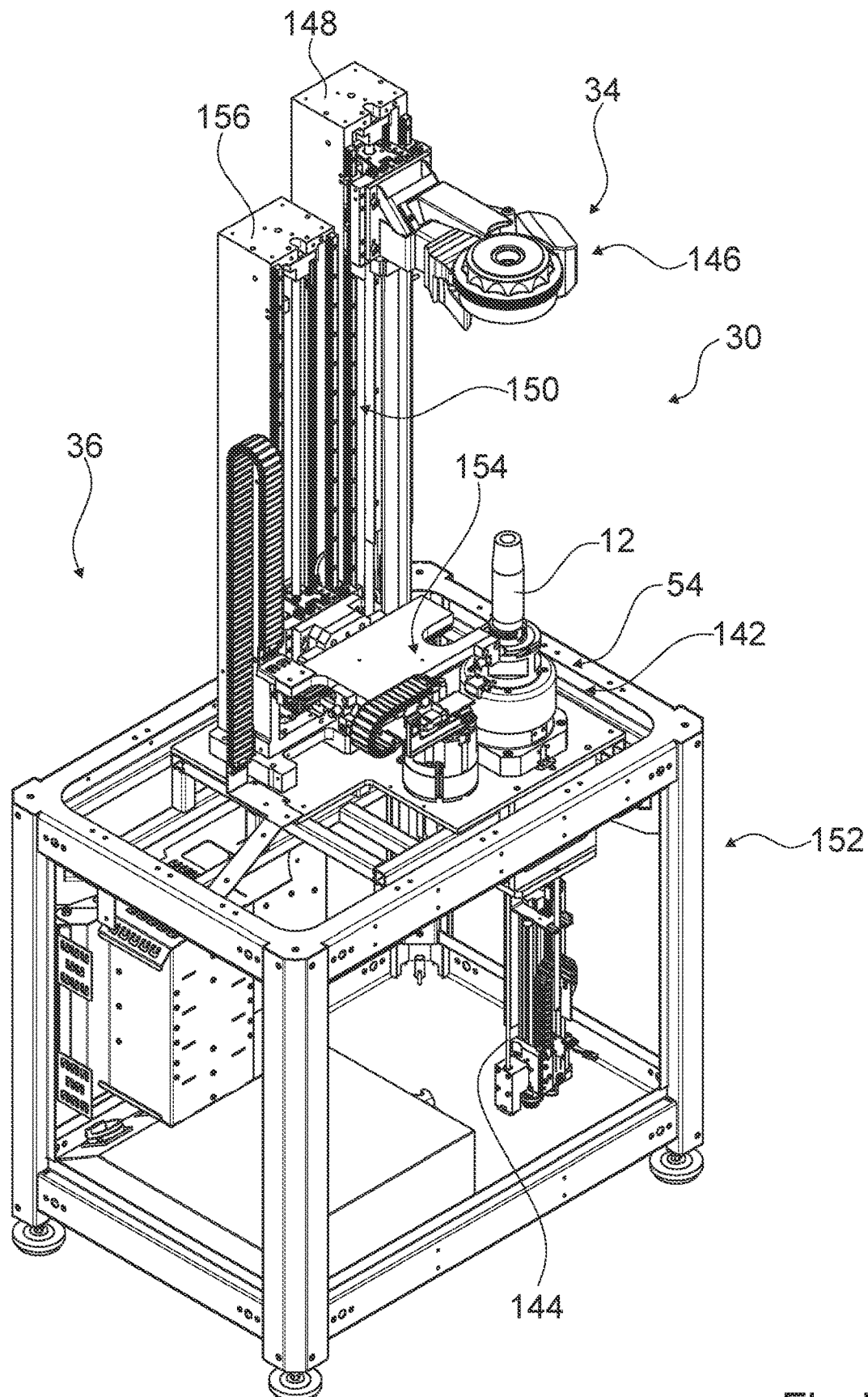
Figure 8:
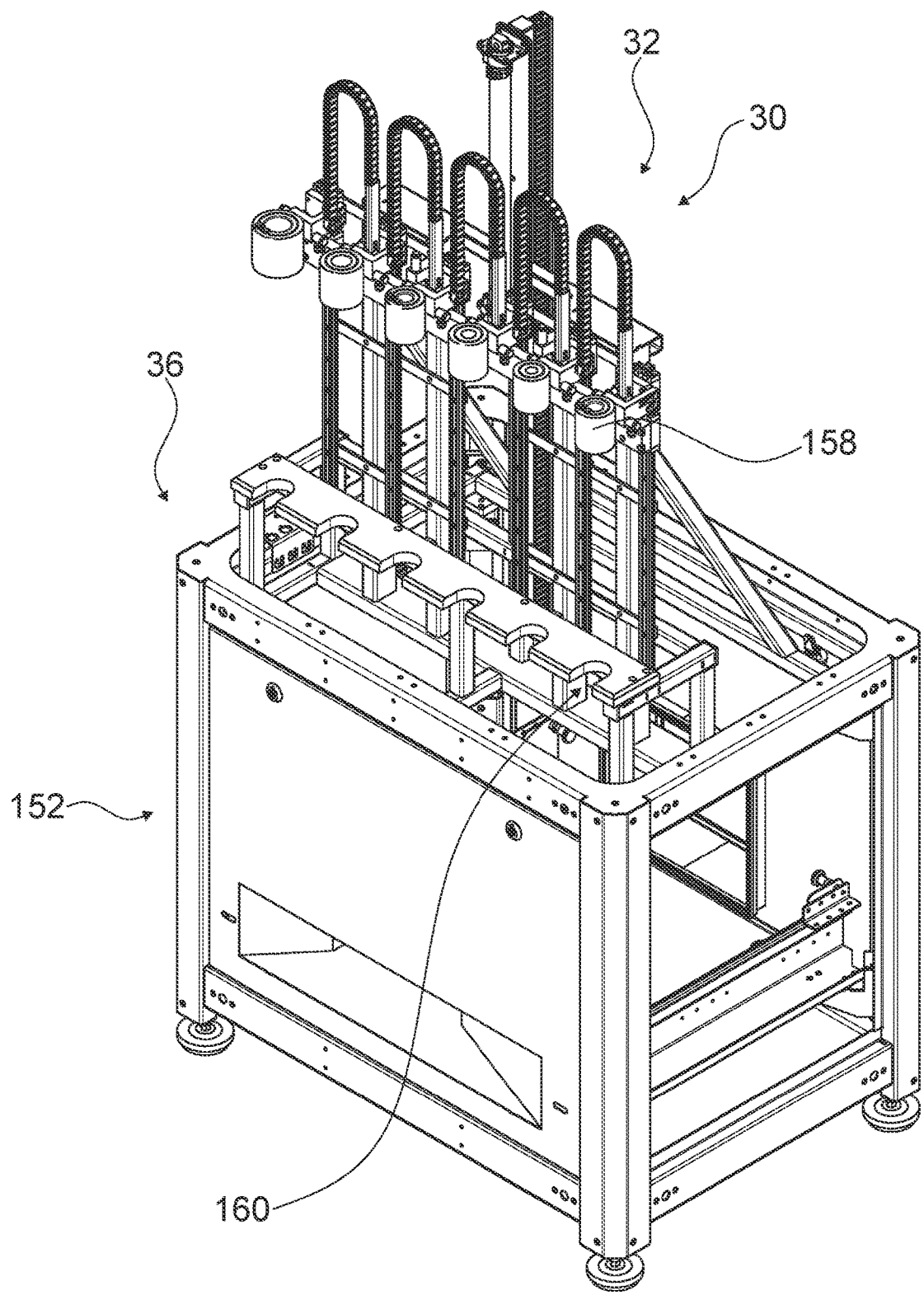
Figure 9:
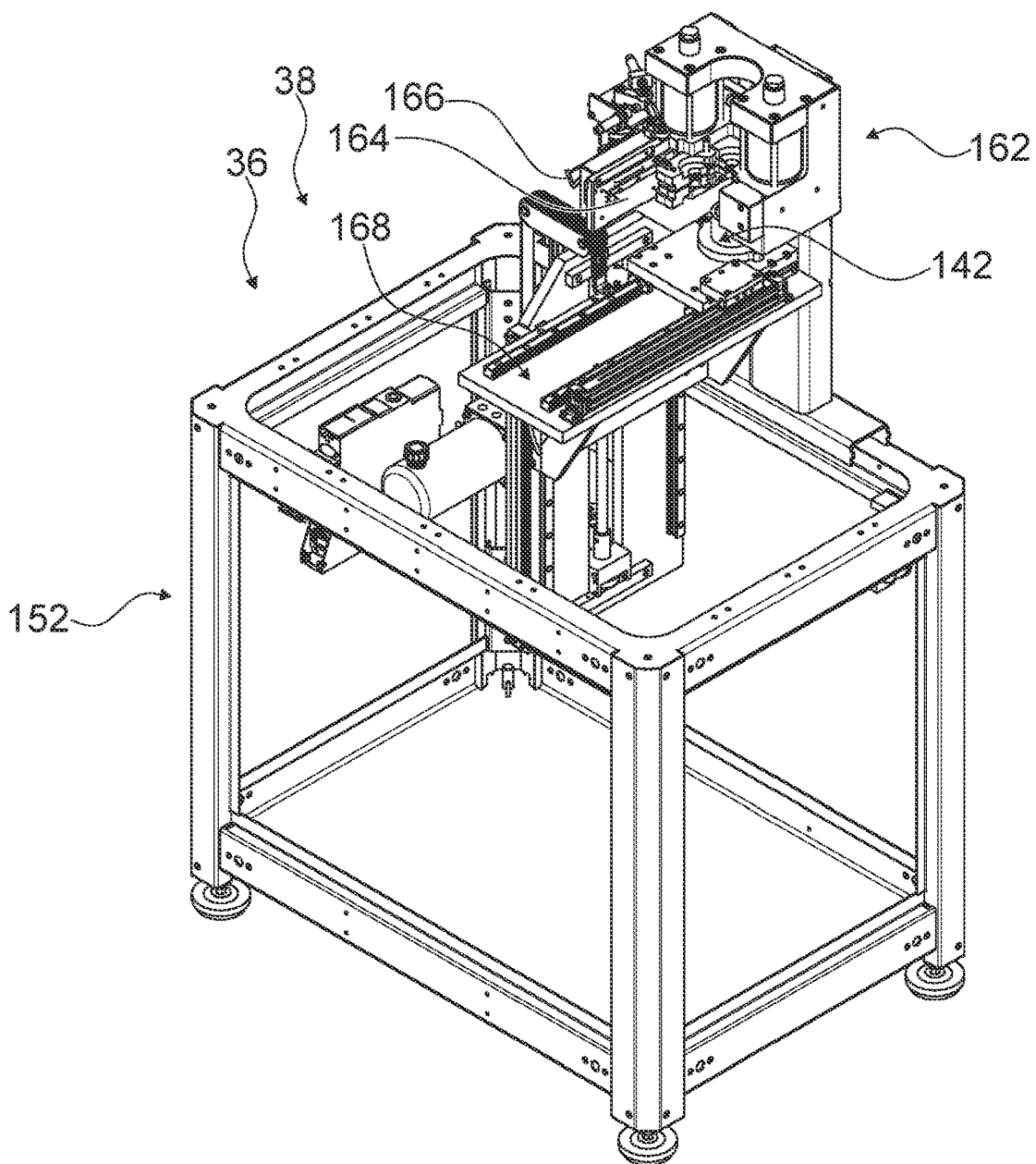
Figure 10:
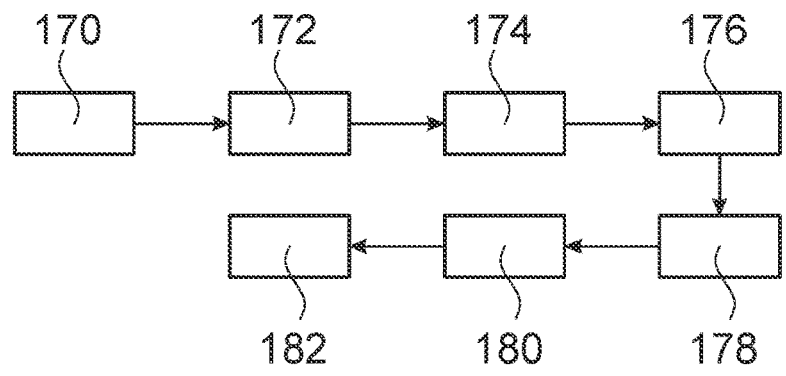
Figure 11:
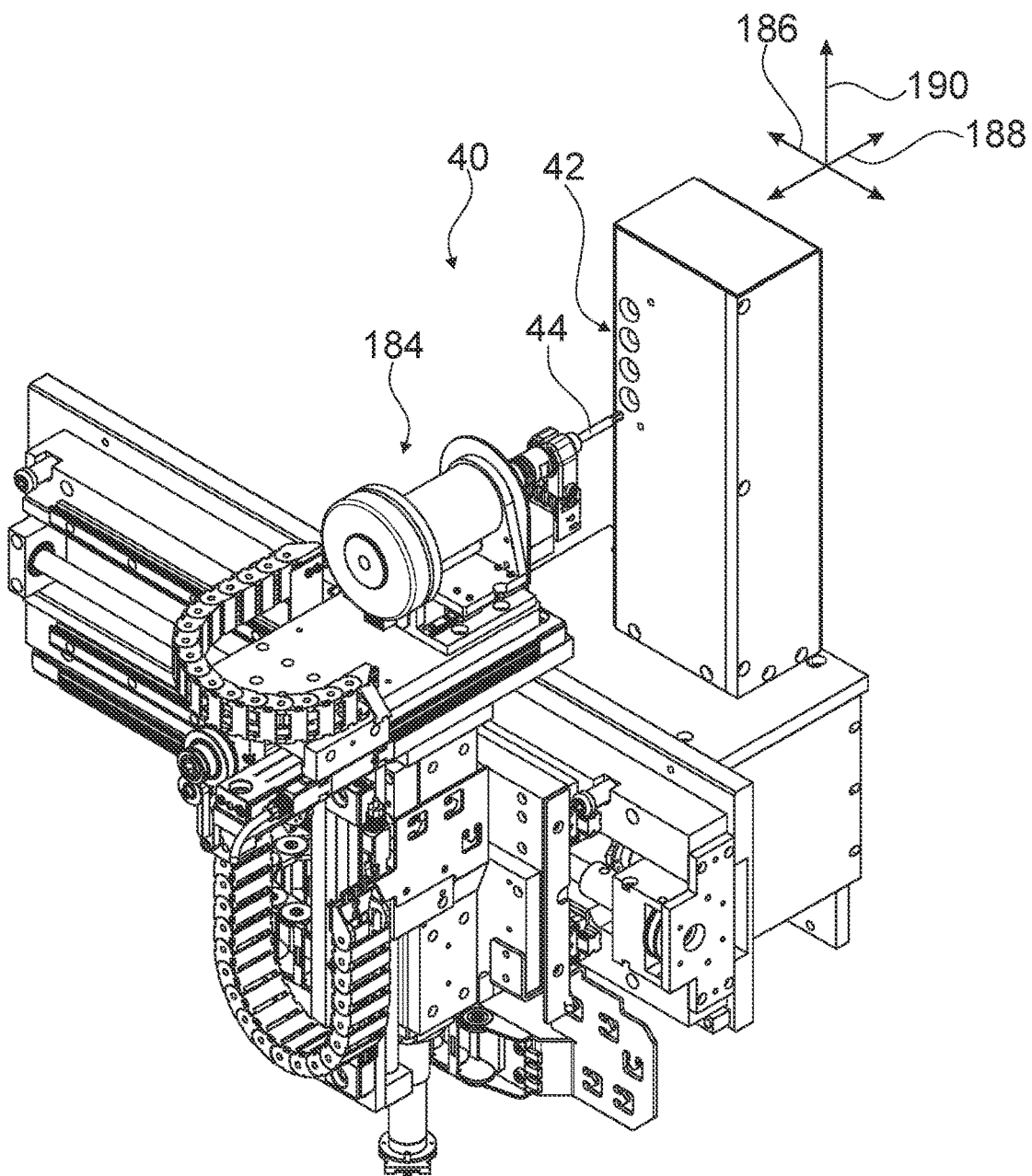
Figure 12:
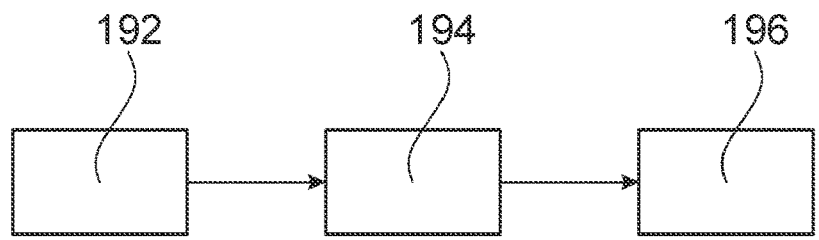
Figure 13:
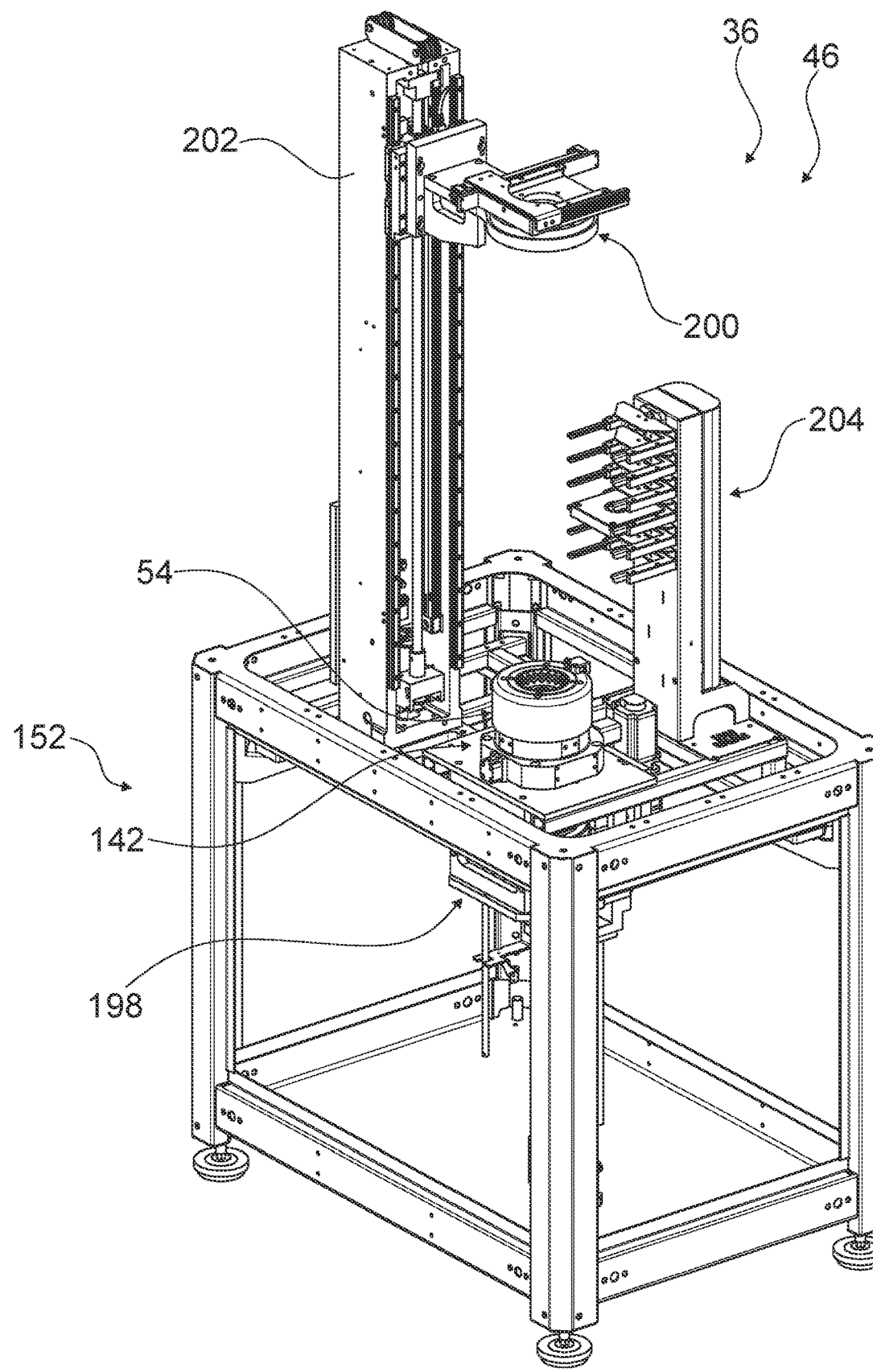
Figure 14:
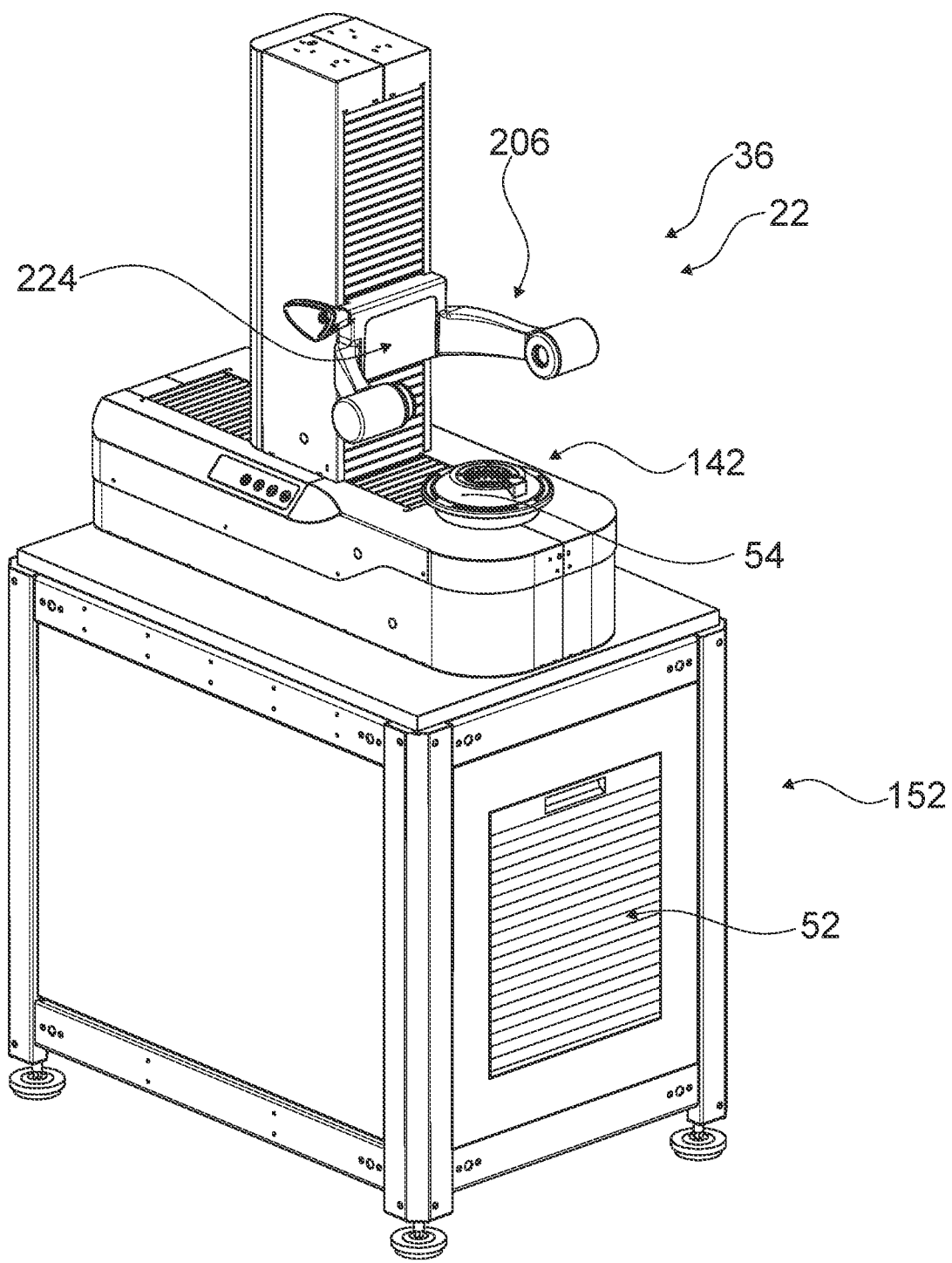
Figure 15:
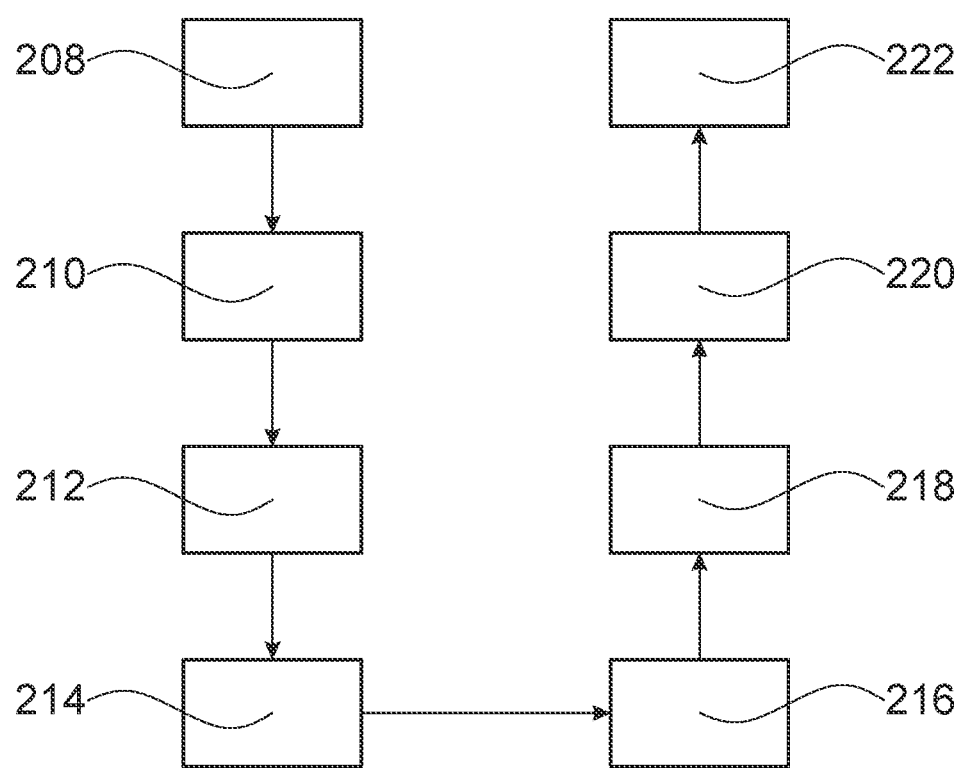

It is shown in:

FIG. 1 an exemplary tool and an exemplary tool holder,

FIG. 2 a schematic perspective exterior view onto a multi-clamping and measuring and/or presetting station, FIG. 3 a schematic view of the multi-clamping and measuring and/or presetting station with an arrangement of the individual components, in particular tool clamping-in units, handling robot and measuring and/or presetting apparatus, FIG. 4 a schematic flow chart of a cleaning process of the multi-clamping and measuring and/or presetting station, FIG. 5 a schematic flow chart of a balancing process of the multi-clamping and measuring and/or presetting station, FIG. 6 a schematic side view of a portion of the multi-clamping and measuring and/or presetting station, FIG. 7 a schematic perspective view of a tool clamping-in unit of the multi-clamping and measuring and/or presetting station, which is embodied as a shrink-clamping station, FIG. 8 a schematic perspective view of a cooling station of the shrink-clamping station, FIG. 9 a schematic perspective view of a tool clamping-in unit of the multi-clamping and measuring and/or presetting station, which is embodied as a compression-clamping station, FIG. 10 a schematic flow chart of a compression-clamping process of the compression-clamping station, FIG. 11 a schematic perspective view of a portion of a tool clamping-in unit of the multi-clamping and measuring and/or presetting station, which is embodied as a hydraulic-expansion screw-driving station, FIG. 12 a schematic flow chart of a clamping-in process and a clamping-out process of the hydraulic-expansion screw-driving station, FIG. 13 a schematic perspective view of a tool clamping-in unit of the multi-clamping and measuring and/or presetting station, which is embodied as a union-nut screw-driving station, FIG. 14 a schematic perspective view of a measuring and/or presetting apparatus of the multi-clamping and measuring and/or presetting station, and FIG. 15 a schematic flow chart of a method for a mounting/demounting of a tool into or from a tool holder.

DESCRIPTION OF THE EXEMPLARY EMBODIMENT

FIG. 1 shows an exemplary tool 10 and an exemplary tool holder 12, The illustrated tool 10 is embodied as a shaft tool, in particular as a shaft drill. The illustrated tool 10 comprises a tool shaft 70. Alternatively the tool 10 could also be embodied as a shaft tool that differs from a shaft drill. The illustrated tool holder 12 is exemplarily depicted as a tool chuck with a union nut 72, the union nut 72 being in particular implemented as a union nut 72 that is free of tool surfaces. Alternatively the tool holder 12 could also be realized as a tool holder 12 differing from a tool chuck with a union nut 72, for example as a shrink-clamp chuck, as a collet chuck, as a hydraulic-expansion chuck or the like. The tool 10 is configured to be fixated, in particular clamped, in the tool holder 12. The tool holder 12 and the tool 10 clamped in the tool holder 12 implement an assembled tool unit 74.

FIG. 2 shows a multi-clamping and measuring and/or presetting station 68 for tools 10. The multi-clamping and measuring and/or presetting station 68 is configured for a fully automated mounting of tools 10 in tool holders 12. The multi-clamping and measuring and/or presetting station 68 is configured for a fully automated demounting of tools 10 from tool holders 12. The multi-clamping and measuring and/or presetting station 68 is configured for a fully automated presetting of tools 10 in the tool holders 12. The multi-clamping and measuring and/or presetting station 68 is configured for a fully automated length adjustment of tools 10 in the tool holders 12. The multi-clamping and measuring and/or presetting station 68 is configured for a fully automated measuring of tools 10, tool holders 12 and/or tool units 74.

The multi-clamping and measuring and/or presetting station 68 comprises a plurality of fully automated tool clamping-in units 14, 16, 18, 20 (see also FIG. 3 or FIGS. 7, 9, 11 and 13). The tool clamping-in units 14, 16, 18, 20 are configured for a clamping-in of the tools 10 in the tool holders 12 to create tool units 74. The tool clamping-in units 14, 16, 18, 20 are configured to clamp the tools 10 out of the tool holders 12 for a disassembly of tool units 74. The multi-clamping and measuring and/or presetting station 68 comprises an optical measuring and/or presetting apparatus 22 for tools 10 (see also FIG. 3 or FIG. 14). The measuring and/or presetting apparatus 22 is configured for a fully automated adjustment of tools 10 in the tool holders 12, in particular a length adjustment, and for an optical measuring of tools 10 in the tool holders 12. The multi-clamping and measuring and/or presetting station 68 comprises a handling robot 24 (see also FIG. 3 or FIG. 6). The handling robot 24 is configured for a fully automated moving of tools 10 and tool holders 12 between the tool clamping-in units 14, 16, 18, 20 and the measuring and/or presetting apparatus 22.

The multi-clamping and measuring and/or presetting station 68 comprises a housing 26. The housing 26 is embodied as a shared housing 26 of the handling robot 24, the tool clamping-in units 14, 16, 18, 20 and the measuring and/or presetting apparatus 22. The housing 26 encloses the handling robot 24, the tool clamping-in units 14, 16, 18, 20 and the measuring and/or presetting apparatus 22 to a large extent, preferably completely. The housing 26 is implemented substantially in a rectangular-cuboid shape. The housing 26 comprises a gate unit 62. The gate unit 62 is configured for a loading and/or unloading of tools 10 and/or tool holders 12 into and/or out of an interior of the multi-clamping and measuring and/or presetting station 68. The gate unit 62 comprises in the present case two separate gates 76, 80. Alternatively it is conceivable that the gate unit 62 comprises more or less than two gates 76, 80. The gates 76, 80 can be closed from the outside. In the present case, the gates 76, 80 can be closed by means of a roller-shutter-like closure element 82. Alternatively it is also conceivable that the closure element 82 is implemented as a flap, as a floor-to-ceiling door, as a slide door, or as another closure element 82 known to someone skilled in the art. The multi-clamping and measuring and/or presetting station 68 comprises a control and/or regulation unit 60. The control and/or regulation unit 60 is at least configured to control the closure element 82, in particular an opening state of the closure element 82. The control and/or regulation unit 60 is at least configured to control and/or regulate an operation of the multi-clamping and measuring and/or presetting station 68, in particular of the components of the multi-clamping and measuring and/or presetting station 68, preferably at least of the handling robot 24, depending on an opening state of the closure element 82. If one of the gates 76, 80 is open towards the outside, the control and/or regulation unit 60 prevents the handling robot 24 from accessing the gates 76, 80 from an inside. It is conceivable that the gates 76, 80 are designed such that it is possible for a tool transport wagon to be driven directly into the gate 76, 80 and to be parked there.

The gate unit 62 comprises a signal device 64. The signal device 64 is configured for outputting to an operator at least one signal by which it can be perceived whether ready-mounted combinations of tool 10 and tool holder 12, i.e. ready-mounted tool units 74, which are situated in the gate unit 62, are assembled correctly. The signal device 64 is embodied as a luminaire unit 66. The luminaire unit 66 is configured for outputting light signals in at least two different light colors. The luminaire unit 66 is configured to at least partially illuminate the gate unit 62, in particular the gates 76, 80, in color(s). Different light colors outputted by the luminaire unit 66 are configured to signalize different operation states of the multi-clamping and measuring and/or presetting station 68 or of the gate unit 62. For example, a yellow light could signalize a stand-by operation. For example, a red light could signalize a fault or a presence of faultily assembled tool units 74 in a gate 76, 80. For example, a blue light could signalize a running operation. For example, a green light could signalize a completed order or a gate 76, 80 being ready for re-loading or for removal of ready-mounted tool units 74. Moreover the multi-clamping and measuring and/or presetting station 68 comprises a status light 84 for a general signalization of a current operation state of the multi-clamping and measuring and/or presetting station 68 independently from a status of the gate unit 62. The status light 84 is arranged above the housing 26. Alternatively the status light 84 could also be integrated in the housing 26, in particular in a surface of the housing 26.

The multi-clamping and measuring and/or presetting station 68 comprises an operation panel 86. The operation panel 86 is embodied as a screen, in particular a touch screen. The operation panel 86 is configured for a programming, operating and/or monitoring of the multi-clamping and measuring and/or presetting station 68, of the components of the multi-clamping and measuring and/or presetting station 68 and/or of the gate unit 62. The operation panel 86 is realized such that it is integrated in the housing 26. The surface of the screen of the operation panel 86 is implemented to be substantially flush-mounted with the surface of the housing 26. The housing 26 comprises a flap 28. The flap 28 can be opened from the outside. The flap 28 permits access to the measuring and/or presetting apparatus 22 that is located in the interior of the housing 26. The flap 28 allows a manual operation of the measuring and/or presetting apparatus 22 from outside of the housing 26. The control and/or regulation unit 60 is at least configured for setting an operation mode of the measuring and/or presetting apparatus 22 depending on an opening state of the flap 28. Upon opening of the flap 28 the control and/or regulation unit 60 switches the measuring and/or presetting apparatus 22 into a manual operation mode. Upon closing of the flap 28 the control and/or regulation unit 60 switches the measuring and/or presetting apparatus 22 into a fully automated operation mode. When the flap 28 is open, the control and/or regulation unit 60 at least prevents an access of the handling robot 24 to the measuring and/or presetting apparatus 22 from the inside. The multi-clamping and measuring and/or presetting station 68 comprises an additional operation terminal 88. The operation terminal 88 is configured for a manual operation of the measuring and/or presetting apparatus 22. The operation terminal 88 is freely displaceable at least along a side wall 90 of the housing 26, in particular along the side wall 90 of the housing 26 having the flap 28. In this way a high level of operation comfort is advantageously achievable.

The multi-clamping and measuring and/or presetting station 68 comprises a recognition unit 58. The recognition unit 58 is configured to recognize a tool holder 12. The recognition unit 58 is configured to recognize a tool 10. In the case shown the recognition unit 58 is implemented as a OR code scanner and/or barcode scanner. The control and/or regulation unit 60 is configured, on the basis of the data determined by the recognition unit 58, to prepare the tool clamping-in unit 14, 16, 18, 20 that is suitable for the respective recognized tool holder 12. The control and/or regulation unit 60 is configured, on the basis of the data determined by the recognition unit 58, to prompt the handling robot 24 to convey the recognized tool holder 12 to the suitable prepared tool clamping-in unit 14, 16, 18, 20 for a mounting of a tool 10 in the tool holder 12, respectively for a demounting of a tool 10 from the tool holder 12.

FIG. 3 shows a schema of inner workings of the multi-clamping and measuring and/or presetting station 68. All four fully automated tool clamping-in units 14, 16, 18, 20 are embodied as different tool clamping-in units 14, 16, 18, 20, which are at least configured for a fully automated mounting of tools 10 in respectively different tool holders 12, with respectively different clamping methods and/or for a fully automated demounting of tools 10 out of respectively different tool holders 12, with respectively different clamping methods. The first tool clamping-in unit 14 is configured for tool holders 12 with a first clamping method. The second tool clamping-in unit 16 is configured for tool holders 12 with a second clamping method which differs from the clamping method that is executable by the first tool clamping-in unit 14. The third tool clamping-in unit 18 is configured for tool holders 12 with a third clamping method which is different from the clamping methods that are executable by the first tool clamping-in unit 14 and the second tool clamping-in unit 16. The fourth tool clamping-in unit 20 is configured for tool holders 12 with a fourth clamping method which is different from the clamping methods that are executable by the first tool clamping-in unit 14, by the second tool clamping-in unit 16 and by the third tool clamping-in unit 18. The four tool clamping-in units 14, 16, 18, 20 are implemented completely separately from one another. The four tool clamping-in units 14, 16, 18, 20 are each fully functional independently from the other tool clamping-in units 14, 16, 18, 20. All four tool clamping-in units 14, 16, 18, 20 are loaded by the handling robot 24.

The multi-clamping and measuring and/or presetting station 68 comprises a tool assembly station 56. The tool assembly station 56 is configured for a fully automated mounting and/or demounting of tools 10 which are composed of a plurality of parts. The mounting and/or demounting of the tools 10 may herein be carried out either by the handling robot 24 or by a separate handling device of the tool assembly station 56. The handling robot 24 is configured for loading the tool assembly station 56. The multi-clamping and measuring and/or presetting station 68 comprises a cleaning station 48. The multi-clamping and measuring and/or presetting station 68 comprises a further cleaning station 92. The cleaning station 48, 92 is configured for a cleaning at least of a portion of the tool 10, in particular a cutter of the tool 10, prior to a mounting in the tool holder 12. The cleaning station 48, 92 is configured for a cleaning at least of a portion of the tool 10, in particular a cutter of the tool 10, prior to a demounting of the tool 10 from the tool holder 12. One of the cleaning stations 48, 92 is configured for a cleaning of the tool 10 by spraying the tool 10 with water vapor from a water vapor spray nozzle. One of the cleaning stations 48, 92 is configured for a cleaning of the tool 10 by blotting. The blotting and/or the spraying may herein be carried out either by the handling robot 24 or by a separate handling device of the cleaning station 48, 92. The handling robot 24 is configured for loading the cleaning stations 48, 92. The measuring and/or presetting apparatus 22 is configured for an optical examination of a cleanliness of a part of a tool 10 cleaned in at least one of the cleaning stations 48, 92.

FIG. 4 shows a flow chart of a cleaning process of the multi-clamping and measuring and/or presetting station 68. In at least one method step 94 a contaminated tool 10 or a contaminated tool unit 74 is conveyed to the multi-clamping and measuring and/or presetting station 68 via the gate unit 62. In at least one further method step 96 the contaminated tool 10 or the contaminated tool unit 74 is moved from the gate unit 62 to the measuring and/or presetting apparatus 22 and is inserted therein by the handling robot 24. In at least one further method step 106 the contaminated tool 10 or the contaminated tool unit 74 is optically measured. In at least one further method step 108 the contaminated tool 10 or the contaminated tool unit 74 is moved to one of the cleaning stations 48, 92 and is inserted in the cleaning station 48, 92 by the handling robot 24. In at least one cleaning step 98 the contaminated tool 10 or the contaminated tool unit 74 is cleaned in a first one of the two cleaning stations 48, 92. In at least one further cleaning step 100 the contaminated tool 10 or the contaminated tool unit 74 is cleaned in a second one of the two cleaning stations 48, 92. In at least one further method step 102 the cleaned tool 10 or the cleaned tool unit 74 is moved from the cleaning station 48, 92 to the measuring and/or presetting apparatus 22 and is inserted in the measuring and/or presetting apparatus 22 by the handling robot 24. In at least one further method step 104 the tool 10 or the tool unit 74 is optically measured once again and thus checked. If the tool 10 or the tool unit 74 still has contaminations, the tool 10 or the tool unit 74 is re-conveyed to the cleaning stations 48, 92 and the cleaning steps 98, 100 are carried out once again. If on the other hand the tool 10 or the tool unit 74 is free of contaminations, the cleaning process is terminated. After termination of the cleaning process the tool 10 or the tool unit 74 is conveyed to one of the tool clamping-in units 14, 16, 18, 20 by the handling robot 24 in at least one further method step 110.

The multi-clamping and measuring and/or presetting station 68 comprises a balancing station 50 (see FIG. 3). The balancing station 50 is configured to determine an imbalance of a combination of tool 10 and tool holder 12, i.e. of a tool unit 74. The balancing station 50 is configured to determine the imbalance by a rotation of the tool unit 74. The handling robot 24 is configured for a loading of the balancing station 50.

FIG. 5 shows a flow chart of a balancing process of the multi-clamping and measuring and/or presetting station 68. In at least one method step 112 a tool unit 74 is created in one of the tool clamping-in units 14, 16, 18, 20. In at least one further method step 114 the tool unit 74 is moved from the tool clamping-in unit 14, 16, 18, 20 to the balancing station 50 and is inserted therein by the handling robot 24. In at least one balancing step 116 an imbalance of the tool unit 74 is determined by a rotation of the tool unit 74. If an imbalance is below a tolerated imbalance, the balancing process is terminated. After termination of the balancing process, in at least one further method step 118 the tool unit 74 is deposited in the gate unit 62 by the handling robot 24 for removal from the multi-clamping and measuring and/or presetting station 68. If the imbalance is above a tolerated imbalance, in at least one further method step 120 the tool unit 74 is transferred back to the tool clamping-in unit 14, 16, 18, 20 by the handling robot 24. In at least one further method step 122 the tool unit 74 is first disassembled and then re-assembled. In at least one further method step 124 the re-assembled tool unit 74 is re-conveyed to the balancing station 50 and the imbalance of the tool unit 74 is determined once again in the balancing step 116. If the imbalance of the tool unit 74 is still above the tolerated imbalance, in at least one further method step 126 the tool unit 74 is either dismounted and combined with another tool unit 74, or it is once more disassembled and re-assembled, or it is discarded.

The components of the multi-clamping and measuring and/or presetting station 68 are arranged in a rectangle around the handling robot 24 (see FIG. 3). The handling robot 24 is arranged centrally in the multi-clamping and measuring and/or presetting station 68, in particular in the housing 26. The handling robot 24 is arranged in such a way that it is able to reach all components of the multi-clamping and measuring and/or presetting station 68. The components of the multi-clamping and measuring and/or presetting station 68 constitute in this context the four tool clamping-in units 14, 16, 18, 20, the measuring and/or presetting apparatus 22, the cleaning stations 48, 92, the balancing station 50 and/or the gates 76, 80. The multi-clamping and measuring and/or presetting station 68 has a modular construction. The multi-clamping and measuring and/or presetting station 68 comprises a plurality of modules 36. Each of the above-mentioned components is allocated to a module 36. The first tool clamping-in unit 14 implements a module 36. The second tool clamping-in unit 16 implements a module 36. The third tool clamping-in unit 18 implements a module 36. The fourth tool clamping-in unit 20 implements a module 36. The cleaning station 48 implements a module 36. The further cleaning station 92 implements a module 36. The balancing station 50 implements a module 36. Each gate 76, 80 of the gate unit 62 implements a module 36. The measuring and/or presetting apparatus 22 implements a module 36. The handling robot 24 implements a module 36 or is composed of a plurality, in particular of four, modules 36. An arrangement of the components of the multi-clamping and measuring and/or presetting station 68 within the housing 26 is module-wise selectable and/or module-wise modifiable. A combination of the components of the multi-clamping and measuring and/or presetting station 68 within the housing 26 is module-wise selectable and/or module-wise modifiable.

All modules 36 have a uniform module width 128. The module width 128 is approximately 700 mm. All modules 36 have a uniform module depth 130. The module depth 130 is approximately 1000 mm. All modules 36 have a uniform module height 134 (see FIG. 6). The module height 134 is approximately 1000 mm. It is conceivable that at least one of the modules 36 has a module width 128 that corresponds to a multifold of the module widths 128 of further modules 36. It is conceivable that at least one of the modules 36 has a module depth 130 that corresponds to a multifold of the module depth 130 of further modules 36. The multi-clamping and measuring and/or presetting station 68 comprises a plurality of module places 78. Each module 36 occupies exactly one module place 78. In the case shown the multi-clamping and measuring and/or presetting station 68 comprises sixteen modules 36. Here the handling robot 24 occupies four module spaces 78. The modules 36 comprise connection elements 132. The connection elements 132 are configured for a quick-mounting of the modules 36 with one another. The connection elements 132 are respectively arranged in identical positions on each module 36. Each module 36 comprises a positioning surface 136 for receiving the functional units of the components of the multi-clamping and measuring and/or presetting station 68. The positioning surfaces 136 of different modules 36, in particular with the exception of the modules 36 allocated to the handling robot 24, are arranged at identical height levels, in particular the module height 134. The multi-clamping and measuring and/or presetting station 68 comprises a control cabinet 138. The control cabinet 138 comprises at least the control and/or regulation unit 60. The control cabinet 138 is embodied as a module 36. The control cabinet 138 comprises a door 140. The door 140 of the control cabinet 138 is integrated in the housing 26. The door 140 of the control cabinet 138 is accessible from outside the multi-clamping and measuring and/or presetting station 68.

FIG. 7 illustrates a tool clamping-in unit 14, 16, 18, 20 that is implemented as a shrink-clamping station 30. The shrink-clamping station 30 comprises a module frame 152, which the functional units of the shrink-clamping station 30 are mounted on. The shrink-clamping station 30 comprises a holding device 142 for tool holders 12. The holding device 142 comprises a length-adjustment pin 144 for a presetting of an insertion depth for a tool 10 in the tool holder 12. The length-adjustment pin 144 is configured to be slid into the tool holder 12 from below, thus forming an abutment for a tool 10 that is inserted into the tool holder 12 in a shrink-clamping process. In the holding device 142 shown in FIG. 7 a shrink-clamp chuck is positioned. The shrink-clamping station 30 comprises a heating station 34. The heating station 34 comprises an induction coil unit 146. The induction coil unit 146 is configured to thermally expand the shrink-clamp chuck. The induction coil unit 146 is configured to be put over the shrink-clamp chuck. The shrink-clamping station 30 comprises a tower 148. The tower 148 comprises support rails 150. The induction coil unit 146 is linearly movable up and down along the support rails 150. The induction coil unit 146 is movable towards the holding device 142 along the support rails 150. The shrink-clamping station 30 comprises a gripper device 154. The gripper device 154 is configured for gripping a tool 10 or a tool holder 12 and to move it vertically relative to the holding device 142. The gripper device 154 is configured for a fully automated insertion of a tool holder 12 in the holding device 142 and/or for a fully automated removal of a tool holder 12 therefrom. The gripper device 154 is configured for a fully automated insertion of a tool 10 in a tool holder 12, in particular a shrink-clamp chuck, and/or for a fully automated removal of a tool 10 therefrom. The shrink-clamping station 30 comprises a further tower 156, on which the gripper device 154 is supported such that it is linearly vertically movable. The gripper device 154 is furthermore linearly horizontally supported on the further tower 156.

The shrink-clamping station 30 comprises besides the heating station 34 a cooling station 32, which is shown in FIG. 8. The cooling station 32 and the heating station 34 are implemented as respectively separate modules 36. The cooling station 32 comprises a module frame 152, which the functional units of the cooling station 32 are mounted on. The cooling station 32 is configured for a simultaneous cooling of a plurality of tool holders 12. The cooling station 32 comprises a plurality of cooling cuffs 158 (also called cooling bodies). The cooling cuffs 158 are configured to be put over a heated shrink-clamp chuck for cooling. The cooling cuffs 158 are movable in a fully automated manner. For a heat discharge the cooling cuffs 158 are flowed through by a cooling medium, for example water. The cooling cuffs 158 are respectively supported such that they are linearly vertically movable. The cooling cuffs 158 are linearly vertically movable independently from each other. In the case shown the cooling station 32 comprises six cooling places 160. Each cooling place 160 is configured for a cooling of a shrink-clamp chuck. Thus it is possible for up to six shrink-clamp chucks to be cooled in the cooling station 32 at the same time.

FIG. 9 shows a tool clamping-in unit 14, 16, 18, 20 that is implemented as a compression clamping station 38. The compression clamping station 38 is configured for a mounting of tools 10 into the tool holders 12 by way of a pressing of tool holders 12, in particular collect chucks, or for a demounting of tools 10 from the tool holders 12. The compression clamping station 38 comprises a module frame 152, which the functional units of the compression clamping station 38 are mounted on. The compression clamping station 38 comprises a pressing unit 162, which is driven hydraulically or pneumatically. The pressing unit 162 comprises a closure element 164. The closure element 164 must be closed during a compression clamping process and must be open for a removal or an insertion of a collet chuck. The closure element 164 of the pressing unit 162 comprises an operating and locking lever 166. The operating and locking lever 166 is implemented in such a way that it can be gripped and operated by the handling robot 24. The handling robot 24 is configured to actuate the closure element 164 of the pressing unit 164. The compression clamping station 38 comprises a holding device 142. The holding device 142 of the compression clamping station 38 is configured for a holding of a collet chuck holder of a collet chuck. The compression clamping station 38 comprises a horizontal support rail 168. The support rail 168 of the compression clamping station 38 is configured to movably support the holding device 142 of the compression-clamping station 38 in such a way that it can be moved out of the pressing unit 162 or can be moved into the pressing unit 162. The handling robot 24 is configured to move the holding device 142 of the compression clamping station 38 along the support rail 168 of the compression clamping station 38, FIG. 10 shows a flow chart of a fully automated compression clamping process of the compression clamping station 38, In at least one method step 170 by the handling robot 24 a collet chuck, made up of a collet and a collet chuck holder, with a tool 10 is inserted in the holding device 142 of the compression clamping station 38 moved out of the pressing unit 162. In at least one further method step 172 the holding device 142 of the compression clamping station 38 is pushed into the pressing unit 162 along the support rail 168 of the compression clamping station 38 by the handling robot 24. In at least one further method step 174 the closure element 164 of the pressing unit 162 is closed and locked by the handling robot 24. In at least one compression clamping step 176 the tool 10 is clamped in the collet chuck by a pressing of the collet and the collet chuck holder. In at least one further method step 178 the closure element 164 of the pressing unit 162 is unlocked and opened by the handling robot 24. In at least one further method step 180 the holding device 142 of the compression clamping station 38 is pulled out of the pressing unit 162 along the support rail 168 of the compression clamping station 38 by the handling robot 24. In at least one further method step 182 the ready-clamped tool unit 74 is removed from the compression clamping station 38. In a method for a removal of the tool 10 from the collet chuck the method steps given above are carried out substantially in reverse order.

A tool clamping-in unit 14, 16, 18, 20 of the multi-clamping and measuring and/or presetting station 68 is embodied as a hydraulic-expansion screw-driving station 40. The hydraulic-expansion screw-driving station 40 comprises a module frame 152, which the functional units of the hydraulic-expansion screw-driving station 40 are mounted on. It is conceivable that the hydraulic-expansion screw-driving station 40 is mounted on the measuring and/or presetting apparatus 22. In this case the hydraulic-expansion screw-driving station 40 and the measuring and/or presetting apparatus 22 are mounted on one identical module frame 152. The hydraulic-expansion screw-driving station 40 comprises a screw-driving unit 184 (see FIG. 11). The screw-driving unit 184 is configured to actuate a clamping screw of a tool holder 12, in particular of a hydraulic-expansion chuck, for a clamping or unclamping of the hydraulic-expansion chuck. The screw-driving unit 184 is movable in at least one, preferably in at least two mutually orthogonal, horizontal spatial direction(s) 186, 188. The screw-driving unit 184 is movable in at least one vertical spatial direction 190. The screw-driving unit 184 comprises at least one exchangeable screw head 44. The screw head 44 is fixated on a rotation axis of the screw-driving unit 184. The screw head 44 is configured to engage into a screw head of the clamping screw in a form-fit manner, thus inducing a rotation of the clamping screw. However, different clamping screws may have different screw heads. The hydraulic-expansion screw-driving station 40 therefore comprises a screw head magazine 42. The screw head magazine 42 comprises a plurality of screw heads 44 having different shapes and/or different sizes. The hydraulic-expansion screw-driving station 40 is configured to carry out a fully automated exchange of the active screw head 44.

FIG. 12 shows a flow chart of a fully automated clamping-in and clamping-out process for a tool 10 with a hydraulic-expansion chuck by means of the hydraulic-expansion screw-driving station 40. In at least one method step 192, in a clamping-in process, a clamping screw of a hydraulic expansion chuck, which is free of a tool 10, is screwed in completely, i.e. up to an abutment of the screw-driving unit 184. In this way advantageously a starting point is defined, which is designed to prevent the clamping screw from being screwed out of the hydraulic-expansion chuck completely in a following clamping-out process with the same hydraulic-expansion chuck. In this way a high level of operational safety is advantageously achievable with particularly short down times. In at least one further method step 194 the starting point defined by the complete screwing-in is saved as a parameter in a memory unit of the multi-clamping and measuring and/or presetting station 68. In at least one further method step 196, in a new registration of the same hydraulic-expansion chuck, the parameter deposited in the memory unit is retrieved by the recognition unit 58 and is transmitted to the hydraulic-expansion screw-driving station 40 for a use in the clamping-out process.

FIG. 13 shows a tool clamping-in unit 14, 16, 18, 20 that is implemented as a union nut screw-driving station 46. The union nut screw-driving station 46 is configured for a mounting of tools 10 in a tool holder 12 by a tightening of a union nut 72. The union nut screw-driving station 46 is configured for a demounting of tools 10 out of a tool holder 12 by a releasing of a union nut 72. The union nut screw-driving station 46 is configured for a fully automated tightening and/or releasing of a tool-surface-free union nut 72 (see FIG. 1). The union nut screw-driving station 46 comprises a module frame 152, which the functional units of the union nut screw-driving station 46 are mounted on. The union nut screw-driving station 46 comprises a holding device 142 for tool holders 12. The union nut screw-driving station 46 comprises a drive unit 198, which is configured to bring about a rotation movement of the holding device 142 of the union nut screw-driving station 46 and of the tool holder 12 that is fixated therein. The union nut screw-driving station 46 comprises a torque element 200. The torque element 200 is configured to be jammed with the union nut 72 in a rotationally fixed manner.

The torque element 200 is configured to fixedly hold the union nut 72 such that it cannot follow a rotation of the tool holder 12 that is allocated to the union nut 72. The union nut screw-driving station 46 comprises a tower 202. The torque element 200 is movable vertically up and down along the tower 202. By way of the vertical movement, the torque element 200 can be moved along the tower 202 relative to a tool holder 12 in the holding device 142 of the union nut screw-driving station 46, and can preferably be put over the tool holder 12 at least partially. The handling robot 24 is configured to activate a clamping mechanism of the torque element 200, which is configured for a jamming of the torque element 200 with the union nut 72 of the tool holder 12. The union nut screw-driving station 46 comprises a torque element magazine 204. The torque element magazine 204 comprises a plurality of different torque elements 200, which are respectively configured for a fixation of differently shaped and/or differently sized union nuts 72. The union nut screw-driving station 46 is configured to realize a fully automated exchange of the active torque element 200.

FIG. 14 shows the measuring and/or presetting apparatus 22. The measuring and/or presetting apparatus 22 comprises a module frame 152, which the functional units of the measuring and/or presetting apparatus 22 are mounted on. The measuring and/or presetting apparatus 22 comprises an optical measuring unit 206. The optical measuring unit 206 comprises a transmitted-light arrangement and/or a reflected-light arrangement. The optical measuring unit 206 is configured for a contact-free measuring of tools 10 and/or tool units 74. Moreover it is conceivable that the measuring and/or presetting apparatus 22 comprises additional tactile, electrical or further optical sensors, for example sensors for the measuring of a distance, in particular in a proximity of the optical measuring unit 206, for example in a central region 224 of the optical measuring unit 206. In this way it is advantageously possible to increase a number of determinable parameters of tools 10 that are to be measured and/or of tool units 74 that are to be measured. The measuring and/or presetting apparatus 22 comprises a holding device 142. In the holding device 142 of the measuring and/or presetting apparatus 22 an attachment holder 54 is arranged. Preferentially identical attachment holders 54 are compatible with several, preferably all, holding devices 142 of several, preferably all, components of the multi-clamping and measuring and/or presetting station 68. The attachment holder 54 implements a tool-holder-specific adapter, which is tucked in between the holding device 142 and the tool holder 12. The measuring and/or presetting apparatus 22 comprises an attachment holder magazine 52 for providing a plurality of different attachment holders 54 for different tool holders 12. The handling robot 24 is configured for a loading of the attachment holders 54 with tool holders 12 or with tool units 74.

FIG. 15 shows a flow chart of a method for a mounting or demounting of a tool 10 into or out of a tool holder 12. In at least one method step 208 a tool holder 12 is delivered at the gate unit 62. In at least one further method step 210 the tool holder 12 is recognized by the recognition unit 58. Then, in at least one further method step 212, a tool clamping-in unit 14, 16, 18, 20 that is suitable for the tool holder 12 is identified from a plurality of tool clamping-in units 14, 16, 18, 20 and is prepared accordingly (this means that the suitable adapters, e.g. attachment holders 54 etc. or screw heads 44 etc., are mounted or confirmed). In at least one further method step 214 the tool holder 12 is fully automatedly conveyed to the suitable tool clamping-in unit 14, 16, 18, 20 of the plurality of tool clamping-in units 14, 16, 18, 20. In at least one further method step 216 a tool 10 is clamped into the recognized tool holder 12 by the previously identified and prepared tool clamping-in unit 14, 16, 18, 20 or is clamped out of the recognized tool holder 12 by the previously identified and prepared tool clamping-in unit 14, 16, 18, 20, In at least one further method step 218 the ready-mounted tool unit 74 the ready-demounted tool holder 12 is deposited in the gate unit 62. In at least one further method step 220 a completion of an order, namely a successful clamping-in and/or clamping-out of tools 10 into and/or out of tool holders 12 is signalized by the signal device 64. In at least one further method step 222 the ready-mounted tool unit 74 or the ready-demounted tool holder 12 is removed out of the gate unit 62 by an operator.

REFERENCE NUMERALS 10 tool
12 tool holder
14 first tool clamping-in unit
16 second tool clamping-in unit
18 third tool clamping-in unit
20 fourth tool clamping-in unit
22 measuring and/or presetting apparatus
24 handling robot
26 housing
28 flap
30 shrink-clamping station
32 cooling station
34 heating station
36 module
38 compression clamping station
40 hydraulic-expansion screw-driving station
42 screw head magazine
44 screw head
46 union nut screw-driving station
48 cleaning station
50 balancing station
52 attachment holder magazine
54 attachment holder
56 tool assembly station
58 recognition unit
60 control and/or regulation unit
62 gate unit
64 signal device
66 luminaire unit
68 multi-clamping and measuring and/or presetting station
70 tool shaft
72 union nut
74 tool unit
76 gate
78 module place
80 gate
82 closure element
84 status light
86 operation panel
88 operation terminal
90 side wall
92 further cleaning station
84 method step
96 method step
98 cleaning step
100 cleaning step
102 method step
104 method step
106 method step
108 method step
110 method step
112 method step
114 method step
116 balancing step
118 method step
120 method step
122 method step
124 method step
126 method step
128 module width
130 module depth
132 connection element
134 module height
136 positioning surface
138 control cabinet
140 door
142 holding device
144 length-adjustment pin
146 induction coil unit
148 tower
150 support rails
152 module frame
154 gripper device
156 further tower
158 cooling cuff
160 cooling area
162 pressing unit
164 closure element
166 operating and locking lever
168 support rail
170 method step
172 method step
174 method step
176 compression-clamping step
178 method step
180 method step
182 method step
184 screw-driving unit
186 horizontal spatial direction
188 horizontal spatial direction
190 vertical spatial direction
192 method step
194 method step 196 method step
198 drive unit
200 torque element
202 tower
204 torque element magazine
206 optical measuring unit
208 method step
210 method step
212 method step
214 method step
216 method step
218 method step
220 method step
222 method step
224 central region

The invention claimed is:

1. A multi-clamping and measuring and/or presetting station for tools, which is configured for an automated, preferably fully automated, mounting of tools into tool holders and/or demounting of tools from tool holders and for an adjustment, in particular at least a length adjustment, and/or measuring of the tools in the tool holders, with at least two, in particular fully automated, tool clamping-in units, with at least one, in particular optical, measuring and/or presetting apparatus for tools and with at least one handling robot, which is at least configured to move tools and tool holders between the tool clamping-in units and the measuring and/or presetting apparatus,
wherein at least one tool clamping-in unit is embodied as one of:
a shrink-clamping station comprising a cooling station, which is configured for a simultaneous cooling of a plurality of tool holders,
a compression-clamping station, which is at least configured for mounting tools in tool holders via pressing of the tool holders,
a hydraulic-expansion screw-driving station comprising a screw head magazine containing a plurality of screw heads with different shapes and/or different sizes, the hydraulic-expansion screw-driving station being configured to carry out an automated exchange of the active screw head, or
a union nut screw-driving station which is configured for a mounting/demounting of tools in/from a tool holder by a tightening/releasing of a union nut.

2. The multi-clamping and measuring and/or presetting station according to claim 1, wherein the at least two, in particular fully automated, tool clamping-in units are embodied as different tool clamping-in units, which are at least configured for an automated, in particular fully automated, mounting of tools in respectively different tool holders with respectively different clamping methods, and/or for an automated, preferably fully automated, demounting of tools from respectively different tool holders with respectively different clamping methods.

3. The multi-clamping and measuring and/or presetting station according to claim 1, wherein the tool clamping-in units are implemented separately, in particular completely separately, from one another.

4. The multi-clamping and measuring and/or presetting station according to claim 2, further comprising at least one third tool clamping-in unit for tool holders with a third clamping method which differs from the clamping methods that can be carried out by the two other tool clamping-in units.

5. The multi-clamping and measuring and/or presetting station according to claim 4, further comprising at least one fourth clamping-in unit for tools with a fourth clamping method which differs from the clamping methods that can be carried out by the three other tool clamping-in units.

6. The multi-clamping and measuring and/or presetting station according to claim 1, wherein the tool clamping-in units and the measuring and/or presetting apparatus are arranged at least section-wise around the handling robot.

7. The multi-clamping and measuring and/or presetting station according to claim 1, further comprising a shared housing which encloses at least the handling robot, the tool clamping-in units and the measuring and/or presetting apparatus, at least to a large extent.

8. The multi-clamping and measuring and/or presetting station according to claim 7, wherein the housing comprises a flap that can be opened and permits access to the measuring and/or presetting apparatus as well as a manual operation of the measuring and/or presetting apparatus.

9. The multi-clamping and measuring and/or presetting station according to claim 1, having a modular construction.

10. The multi-clamping and measuring and/or presetting station according to claim 7, wherein the multi-clamping and measuring and/or presetting station has a modular construction, and wherein at least an arrangement at least of part of the components of the multi-clamping and measuring and/or presetting station within the housing is module-wise selectable and/or module-wise modifiable.

11. The multi-clamping and measuring and/or presetting station according to claim 7, wherein the multi-clamping and measuring and/or presetting station has a modular construction, and wherein at least a combination at least of part of the components of the multi-clamping and measuring and/or presetting station within the housing is module-wise selectable and/or module-wise modifiable.

12. The multi-clamping and measuring and/or presetting station according to claim 1, further comprising at least one cleaning station, which is configured for cleaning at least a portion of the tool prior to a mounting in the tool holder or prior to a demounting of the tool from the tool holder.

13. The multi-clamping and measuring and/or presetting station according to claim 12, wherein the measuring and/or presetting apparatus is at least configured for an optical examination of a cleanliness of a portion of a tool that has been cleaned in the cleaning station.

14. The multi-clamping and measuring and/or presetting station according to claim 1, further comprising at least one balancing station, which is configured for a determination of an imbalance of a combination of tool and tool holder.

15. The multi-clamping and measuring and/or presetting station according to claim 1, wherein the measuring and/or presetting apparatus comprises an attachment holder magazine to provide a plurality of different attachment holders.

16. The multi-clamping and measuring and/or presetting station according to claim 1, further comprising a tool assembly station which is configured for a mounting and/or demounting of tools that are composed of several parts.

17. The multi-clamping and measuring and/or presetting station according to claim 1, further comprising a recognition unit which is configured for a recognition of a tool holder, and by a control and/or regulation unit which is configured, on the basis of the data determined by the recognition unit, to prepare at least one tool clamping-in unit and then to prompt the handling robot to convey the tool holder to the prepared tool clamping-in unit for a mounting/demounting of a tool into/from the tool holder.

18. The multi-clamping and measuring and/or presetting station according to claim 7, wherein the housing comprises at least one gate unit which is configured for a loading and/or unloading of tools and/or tool holders, with the gate unit comprising at least one signal device that is configured to output to an operator at least one signal by which it may be perceived whether ready-mounted combinations of tool and tool holder which are situated in the gate unit have been assembled correctly.

19. The multi-clamping and measuring and/or presetting station according to claim 18, wherein the signal device is implemented as a luminaire unit, which is configured to output light signals in at least two different light colors.

20. A method for a mounting/demounting of a tool into/from a tool holder, with a multi-clamping and measuring and/or presetting station according to claim wherein a tool holder is recognized in an at least partly automated manner and is then fully-automatedly conveyed to a suitable tool clamping-in unit of a plurality of tool clamping-in unit.

21. A multi-clamping and measuring and/or presetting station for tools, which is configured for an automated, preferably fully automated, mounting of tools into tool holders and/or demounting of tools from tool holders and for an adjustment, in particular at least a length adjustment, and/or measuring of the tools in the tool holders, with at least two, in particular fully automated, tool clamping-in units, with at least one, in particular optical, measuring and/or presetting apparatus for tools and with at least one handling robot, which is at least configured to move tools and tool holders between the tool clamping-in units and the measuring and/or presetting apparatus,
comprising a shared housing which encloses at least the handling robot, the tool clamping-in units and the measuring and/or presetting apparatus, at least to a large extent.

22. A multi-clamping and measuring and/or presetting station for tools, which is configured for an automated, preferably fully automated, mounting of tools into tool holders and/or demounting of tools from tool holders and for an adjustment, in particular at least a length adjustment, and/or measuring of the tools in the tool holders, with at least two, in particular fully automated, tool clamping-in units, with at least one, in particular optical, measuring and/or presetting apparatus for tools and with at least one handling robot, which is at least configured to move tools and tool holders between the tool clamping-in units and the measuring and/or presetting apparatus,
further comprising at least one of:
a cleaning station, which is configured for cleaning at least a portion of the tool prior to a mounting in the tool holder or prior to a demounting of the tool from the tool holder, wherein the measuring and/or presetting apparatus is at least configured for an optical examination of a cleanliness of a portion of a tool that has been cleaned in the cleaning station,
a tool assembly station which is configured for a mounting and/or demounting of tools that are composed of several parts, or
a balancing station, which is configured for a determination of an imbalance of a combination of tool and tool holder, or
wherein the measuring and/or presetting apparatus comprises an attachment holder magazine to provide a plurality of different attachment holders.

23. A multi-clamping and measuring and/or presetting station for tools, which is configured for an automated, preferably fully automated, mounting of tools into tool holders and/or demounting of tools from tool holders and for an adjustment, in particular at least a length adjustment, and/or measuring of the tools in the tool holders, with at least two, in particular fully automated, tool clamping-in units, with at least one, in particular optical, measuring and/or presetting apparatus for tools and with at least one handling robot, which is at least configured to move tools and tool holders between the tool clamping-in units and the measuring and/or presetting apparatus,
wherein the at least two, in particular fully automated, tool clamping-in units are embodied as different tool clamping-in units, which are at least configured for an automated, in particular fully automated, mounting of tools in respectively different tool holders with respectively different clamping methods, and/or for an automated, preferably fully automated, demounting of tools from respectively different tool holders with respectively different clamping methods,
and further comprising at least one third tool clamping-in unit for tool holders with a third clamping method which differs from the clamping methods that can be carried out by the two other tool clamping-in units.

24. A multi-clamping and measuring and/or presetting station for tools, which is configured for an automated, preferably fully automated, mounting of tools into tool holders and/or demounting of tools from tool holders and for an adjustment, in particular at least a length adjustment, and/or measuring of the tools in the tool holders, with at least two, in particular fully automated, tool clamping-in units, with at least one, in particular optical, measuring and/or presetting apparatus for tools and with at least one handling robot, which is at least configured to move tools and tool holders between the tool clamping-in units and the measuring and/or presetting apparatus,
comprising a recognition unit which is configured for a recognition of a tool holder, and by a control and/or regulation unit which is configured, on the basis of the data determined by the recognition unit, to prepare at least one tool clamping-in unit and then to prompt the handling robot to convey the tool holder to the prepared tool clamping-in unit for a mounting/demounting of a tool into/from the tool holder.

* * * * *